(12) United States Patent
Dunn et al.

(10) Patent No.: US 12,542,605 B1
(45) Date of Patent: Feb. 3, 2026

(54) SYSTEMS AND METHODS FOR MAPPING GEOGRAPHIC SUB-AREAS TO SATELLITE-BASED BASE STATION PLATFORMS IN A CELLULAR NETWORK

(71) Applicant: Space Exploration Technologies Corp., Hawthorne, CA (US)

(72) Inventors: Brian Dunn, San Carlos, CA (US); Owen Chiaventone, Seattle, WA (US)

(73) Assignee: Space Exploration Technologies Corp., Starbase, TX (US)

( * ) Notice: Subject to any disclaimer, the term of this patent is extended or adjusted under 35 U.S.C. 154(b) by 315 days.

(21) Appl. No.: 18/375,319

(22) Filed: Sep. 29, 2023

Related U.S. Application Data

(60) Provisional application No. 63/520,882, filed on Aug. 21, 2023, provisional application No. 63/412,309, filed on Sep. 30, 2022.

(51) Int. Cl.
 *H04B 7/185* (2006.01)
 *H04W 76/11* (2018.01)
(52) U.S. Cl.
 CPC ..... *H04B 7/18532* (2013.01); *H04B 7/18539* (2013.01); *H04W 76/11* (2018.02)
(58) Field of Classification Search
 CPC .......... H04B 7/18532; H04B 7/18539; H04W 76/11
 See application file for complete search history.

(56) References Cited

U.S. PATENT DOCUMENTS

| | | | |
|---|---|---|---|
| 11,121,764 B2 | 9/2021 | Yao et al. | |
| 11,483,877 B2 | 10/2022 | Ravishankar et al. | |
| 2019/0098381 A1* | 3/2019 | Su | H04L 12/413 |
| 2022/0240151 A1 | 7/2022 | Yu et al. | |
| 2023/0261738 A1 | 8/2023 | Xu et al. | |

* cited by examiner

*Primary Examiner* — Benjamin M Thieu

(74) *Attorney, Agent, or Firm* — Polsinelli PC

(57) ABSTRACT

A computer system for mapping geographic sub-areas of a ground area to cells of a radio access network (RAN) implemented by a plurality of satellites can perform steps including one or more of: receiving, from a first satellite, connection data indicating that a first UE has connected to the RAN via a first beam of the first satellite, wherein the connection data identifies a physical localized identifier of the first beam and a connection time; determining, from a mapping of physical localized identifiers to virtual localized identifiers across a plurality of time slots, a first virtual localized identifier associated with the physical localized identifier of the first beam and the connection time, the first virtual localized identifier corresponding to a first of the geographic sub-areas; and, in response to the determining, causing to be stored location data for the first UE indicative of the first geographic sub-area.

52 Claims, 12 Drawing Sheets

RECEIVING, FROM A FIRST SATELLITE, CONNECTION DATA INDICATING THAT A FIRST UE HAS CONNECTED TO THE RAN VIA A FIRST BEAM OF THE FIRST SATELLITE, WHEREIN THE CONNECTION DATA IDENTIFIES A PHYSICAL LOCALIZED IDENTIFIER OF THE FIRST BEAM AND A CONNECTION TIME

↓ 1002

DETERMINING, FROM A MAPPING OF PHYSICAL LOCALIZED IDENTIFIERS TO VIRTUAL LOCALIZED IDENTIFIERS ACROSS A PLURALITY OF TIME SLOTS, A FIRST VIRTUAL LOCALIZED IDENTIFIER ASSOCIATED WITH THE PHYSICAL LOCALIZED IDENTIFIER OF THE FIRST BEAM AND THE CONNECTION TIME, THE FIRST VIRTUAL LOCALIZED IDENTIFIER CORRESPONDING TO A FIRST OF THE GEOGRAPHIC SUB-AREAS

↓ 1004

IN RESPONSE TO THE DETERMINING, CAUSING TO BE STORED LOCATION DATA FOR THE FIRST UE INDICATIVE OF THE FIRST GEOGRAPHIC SUB-AREA

1006

1000

RECEIVING PHYSICAL LOCALIZED IDENTIFIER ASSIGNMENTS FOR A PLURALITY OF BEAMS, WHEREIN EACH BEAM HAS A BEAM FOOTPRINT THAT DEFINES A CELL OF THE RAN ~1102

↓

IN RESPONSE TO ARRIVAL OF A FIRST TIME SLOT, CONTROLLING THE ANTENNA TO DIRECT A FIRST SET OF BEAMS TO A FIRST GROUND AREA AND TO BROADCAST FIRST RAN PARAMETER INFORMATION ON THE FIRST SET OF BEAMS, WHEREIN THE FIRST RAN PARAMETER INFORMATION INCLUDES FIRST PHYSICAL LOCALIZED IDENTIFIERS ASSOCIATED WITH THE FIRST TIME SLOT IN THE PHYSICAL LOCALIZED IDENTIFIER ASSIGNMENTS, WHEREIN THE FIRST GROUND AREA INCLUDES FIRST GEOGRAPHIC SUB-AREAS, AND WHEREIN THE PHYSICAL LOCALIZED IDENTIFIER ASSIGNMENTS FOR THE FIRST SET OF BEAMS CORRESPOND TO FIRST VIRTUAL LOCALIZED IDENTIFIERS ASSOCIATED WITH THE FIRST GEOGRAPHIC SUB-AREAS ~1104

↓

IN RESPONSE TO ARRIVAL OF A SECOND TIME SLOT SUBSEQUENT TO THE FIRST TIME SLOT, CONTROLLING THE ANTENNA TO DIRECT A SECOND SET OF BEAMS TO A SECOND GROUND AREA AND TO BROADCAST SECOND RAN PARAMETER INFORMATION ON THE SECOND SET OF BEAMS, WHEREIN THE SECOND RAN PARAMETER INFORMATION INCLUDES SECOND PHYSICAL LOCALIZED IDENTIFIERS ASSOCIATED WITH THE SECOND TIME SLOT IN THE PHYSICAL LOCALIZED IDENTIFIER ASSIGNMENTS, WHEREIN THE SECOND GROUND AREA INCLUDES SECOND GEOGRAPHIC SUB-AREAS DIFFERENT FROM THE FIRST GEOGRAPHIC SUB-AREAS, AND WHEREIN THE SECOND PHYSICAL LOCALIZED IDENTIFIERS FOR THE SECOND SET OF BEAMS CORRESPOND TO SECOND VIRTUAL LOCALIZED IDENTIFIERS ASSOCIATED WITH THE SECOND GEOGRAPHIC SUB-AREAS ~1106

SYSTEMS AND METHODS FOR MAPPING GEOGRAPHIC SUB-AREAS TO SATELLITE-BASED BASE STATION PLATFORMS IN A CELLULAR NETWORK

CROSS REFERENCE TO RELATED APPLICATIONS

This application claims the benefit of, and priority to, U.S. Provisional Ser. No. 63/412,309 filed Sep. 30, 2022, and U.S. Provisional Ser. No. 63/520,882 filed Aug. 21, 2023, the contents of all of which are hereby incorporated by reference in their entireties.

TECHNICAL FIELD

The present technology pertains to using satellites to provide cellular telecommunications base station services to terrestrial user equipment, and more specifically to mapping geographic areas to base station platforms that move relative to the terrestrial user equipment.

BACKGROUND

Terrestrial cellular telecommunication networks typically rely on Earth-based cellular towers for wireless communication in designated radio frequency bands with user equipment (for example, mobile phones, cellular-enabled computer devices, and the like). The Earth-based cellular towers implement a radio access network (RAN) that links the user equipment to functionality for handling voice calls and SMS messages and providing Internet connectivity, for example. However, communications coverage by Earth-based cellular towers is limited or unreliable in some areas, particularly (but not only) in less developed regions of the world.

The use of satellites in low Earth orbit to provide cellular telecommunication links to terrestrial user equipment has been proposed. However, the accepted telecommunications standards implemented by off-the-shelf user equipment are designed for conditions that include stationary, terrestrial base station hardware, and thus the satellite-based system can operate more efficiently when the satellites successfully create a RAN environment for the user equipment similar to that created by terrestrial base station hardware. For example, the user equipment behavior is configured under a standard terrestrial RAN to expect terrestrial base station locations to be fixed relative to the ground, but the satellites in low Earth orbit have a relatively large velocity relative to the ground. Therefore, in contrast to terrestrial base stations, base stations implemented on each satellite are only in contact with a fixed ground location for a relatively brief time. Accordingly, suitable adjustments are necessary to enable the RAN to operate efficiently.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure introduces a novel approach to ensuring that user equipment in a ground area receive nearly static localized identifier information, for example Tracking Area Codes (in a 4G LTE implementation), in the RAN parameter information broadcast from base station platforms of the system, while multiple different base station platforms (implemented on a series of satellites) are passing relatively quickly over the ground area. Each satellite in succession can direct a plurality of beams towards the ground area, establishing a physical cell of the RAN with each beam. However, rather than cells (i.e., beams) having persistent Tracking Area Codes, the system causes the Tracking Area Codes to be dynamically updated every time the satellite beams are directed to a different ground area. The system can assign virtual localized identifiers to geographic sub-areas of the ground area, and can map the Tracking Area Codes of the beams that will be covering each geographic sub-area over a series of time slots to the virtual localized identifiers. In other words, rather than the user equipment in the ground area seeing a new Tracking Area Code every time a different satellite beam moves into coverage of the ground area, the system enables the different satellite beams covering the ground area in succession to broadcast the same Tracking Area code during that coverage time. This approach can reduce the number of TAC update requests on the RAN, and thus increase the amount of bandwidth available to devote directly to user data. In some implementations, the efficiency can be further improved by using the virtual localized identifiers to create groups of localized identifiers (for example, Tracking Area Lists in a 4G LTE implementation) for the user equipment, and sizing the geographic sub-areas to ensure that a stationary user equipment never has to perform a TAC. In particular, the geographic sub-areas can be sized to satisfy the constraint that, for any first geographic sub-area, the maximum extent of any beam footprint centered on a geographic sub-area having a TAC outside the Tracking Area List for the first geographic sub-area has zero overlap with the first geographic sub-area.

In accordance with an embodiment of the present disclosure, a computer system is provided for mapping geographic sub-areas of a ground area to cells of a radio access network (RAN) implemented by a plurality of satellites. Each of the satellites includes at least one antenna configured to send and receive signals to terrestrial user equipment (UE) via a plurality of directional beams, and each of the beams has a beam footprint that defines a cell of the RAN The computer system includes at least one processor coupled to a memory, and the memory includes instructions that are executable to cause the at least one processor to perform steps that can include one or more of: receiving, from a first satellite of the plurality of satellites, connection data indicating that a first UE has connected to the RAN via a first beam of the first satellite, wherein the connection data identifies a physical localized identifier of the first beam and a connection time; determining, from a mapping of physical localized identifiers to virtual localized identifiers across a plurality of time slots, a first virtual localized identifier associated with the physical localized identifier of the first beam and the connection time, the first virtual localized identifier corresponding to a first of the geographic sub-areas; and, in response to the determining, causing to be stored location data for the first UE indicative of the first geographic sub-area.

In accordance with another embodiment of the present disclosure, a method is provided for mapping geographic sub-areas of a ground area to cells of a radio access network (RAN) implemented by a plurality of satellites. Each of the satellites includes at least one antenna configured to send and receive signals to terrestrial user equipment (UE) via a plurality of directional beams, and each of the beams has a beam footprint that defines a cell of the RAN. The method is implemented by a computer system including at least one processor configured to perform steps that can include one or more of: receiving, from a first satellite of the plurality of satellites, connection data indicating that a first UE has connected to the RAN via a first beam of the first satellite, wherein the connection data identifies a physical localized identifier of the first beam and a connection time; determining, from a mapping of physical localized identifiers to virtual localized identifiers across a plurality of time slots, a first virtual localized identifier associated with the physical localized identifier of the first beam and the connection time, the first virtual localized identifier corresponding to a first of the geographic sub-areas; and, in response to the determining, causing to be stored location data for the first UE indicative of the first geographic sub-area.

In accordance with another embodiment of the present disclosure, a satellite computer system for a satellite is provided. The satellite includes at least one antenna configured to send and receive signals to terrestrial user equipment (UE) on a radio access network (RAN). The satellite computer system includes at least one processor in communication with a memory, the memory storing computer-readable instructions that are executable to cause the at least one processor to perform steps that can include one or more of: receiving physical localized identifier assignments for a plurality of beams to be generated by the at least one antenna over a plurality of time slots, wherein each of the beams has a beam footprint that defines a cell of the RAN; in response to arrival of a first time slot, controlling the at least one antenna to direct a first set of the plurality of beams to a first ground area and to broadcast first RAN parameter information on the first set of beams, wherein the first RAN parameter information includes first physical localized identifiers associated with the first time slot in the physical localized identifier assignments, wherein the first ground area includes a first plurality of geographic sub-areas, and wherein the physical localized identifier assignments for the first set of beams correspond to first virtual localized identifiers associated with the first plurality of geographic sub-areas; and in response to arrival of a second time slot subsequent to the first time slot, controlling the at least one antenna to direct a second set of the plurality of beams to a second ground area and to broadcast second RAN parameter information on the second set of beams, wherein the second RAN parameter information includes second physical localized identifiers associated with the second time slot in the physical localized identifier assignments, wherein the second ground area includes a second plurality of geographic sub-areas different from the first plurality of geographic sub-areas, and wherein the second physical localized identifiers for the second set of beams correspond to second virtual localized identifiers associated with the second plurality of geographic sub-areas.

In accordance with another embodiment of the present disclosure, a method implemented by a satellite computer system on a satellite is provided. The satellite includes at least one antenna configured to send and receive signals to terrestrial user equipment (UE) on a radio access network (RAN). The satellite computer system includes at least one processor configured to perform steps of the method. The steps can include one or more of: receiving physical localized identifier assignments for a plurality of beams to be generated by the at least one antenna over a plurality of time slots, wherein each of the beams has a beam footprint that defines a cell of the RAN; in response to arrival of a first time slot, controlling the at least one antenna to direct a first set of the plurality of beams to a first ground area and to broadcast first RAN parameter information on the first set of beams, wherein the first RAN parameter information includes first physical localized identifiers associated with the first time slot in the physical localized identifier assignments, wherein the first ground area includes a first plurality of geographic sub-areas, and wherein the physical localized identifier assignments for the first set of beams correspond to first virtual localized identifiers associated with the first plurality of geographic sub-areas; and in response to arrival of a second time slot subsequent to the first time slot, controlling the at least one antenna to direct a second set of the plurality of beams to a second ground area and to broadcast second RAN parameter information on the second set of beams, wherein the second RAN parameter information includes second physical localized identifiers associated with the second time slot in the physical localized identifier assignments, wherein the second ground area includes a second plurality of geographic sub-areas different from the first plurality of geographic sub-areas, and wherein the second physical localized identifiers for the second set of beams correspond to second virtual localized identifiers associated with the second plurality of geographic sub-areas.

BRIEF DESCRIPTION OF THE DRAWINGS

In order to describe the manner in which the above-recited issues can be addressed, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 11 illustrates an example another method in accordance with embodiments of the present disclosure.

DESCRIPTION OF EXAMPLE EMBODIMENTS

Figure 1A:
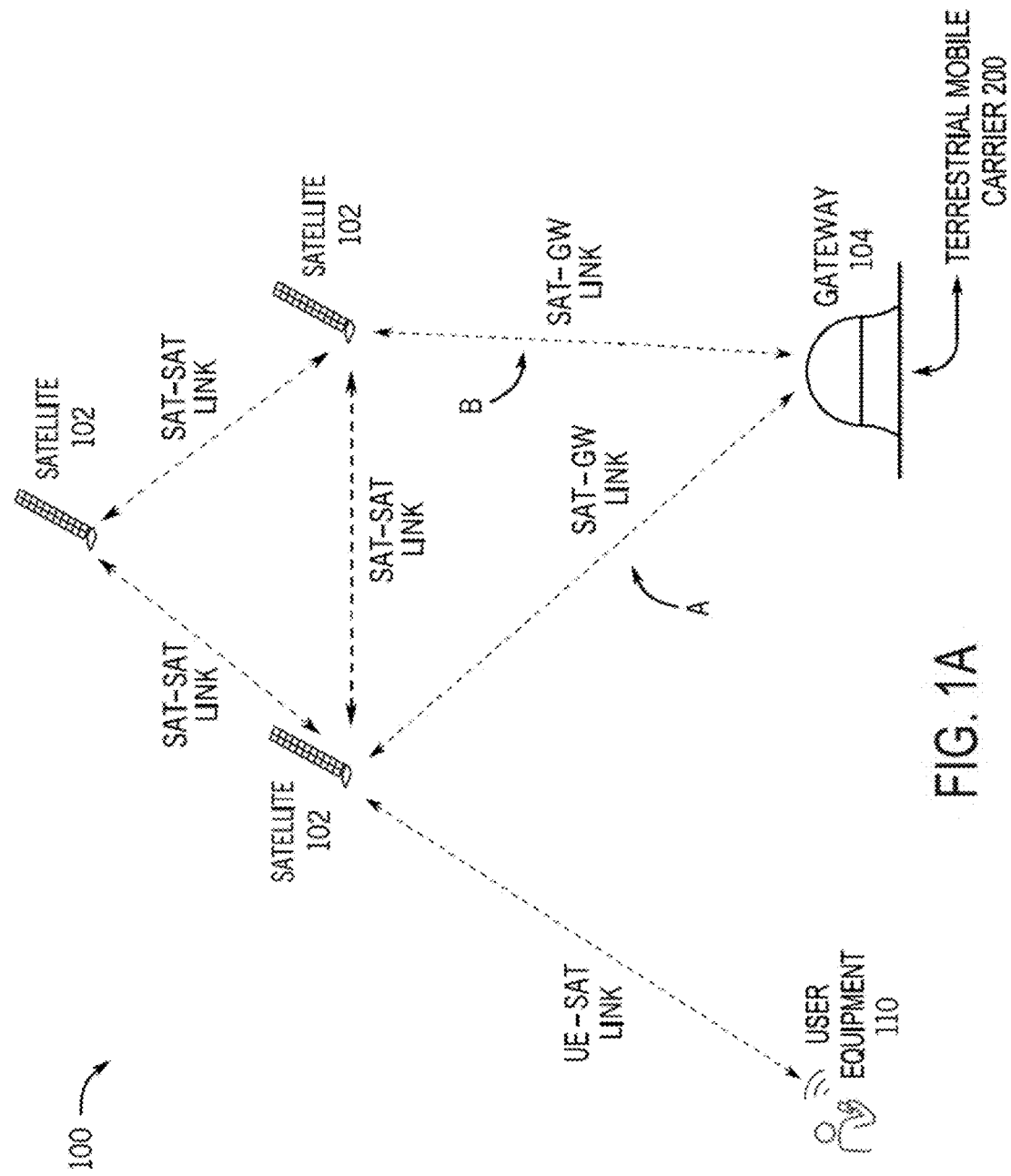
FIG. 1A illustrates a simplified schematic of an exemplary satellite telecommunications system in accordance with embodiments of the present disclosure.

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment. Such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Elements of a Satellite Telecommunications System

Figure 1B:
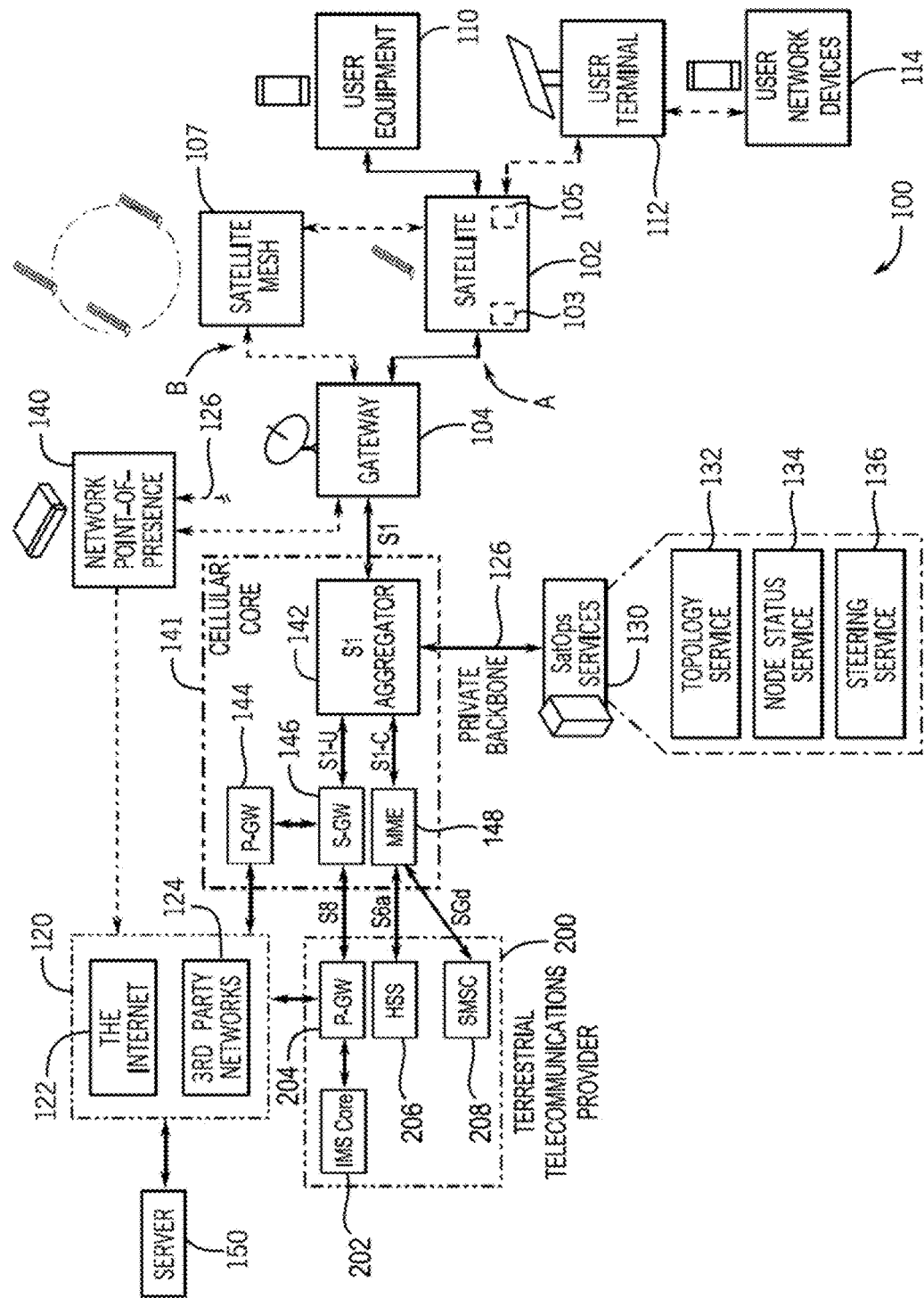
FIG. 1B illustrates a simplified block diagram of the satellite telecommunications system of FIG. 1A in accordance with embodiments of the present disclosure.

FIG. 1A is a simplified schematic, and FIG. 1B is a simplified block diagram, of elements of an exemplary satellite telecommunications system 100 in communication with user equipment (UE) 110. UE 110 may be any device that is capable of communicating with a standard terrestrial cellular phone tower and base station via a radio access network (RAN). For example, UE 110 may be an off-the-shelf mobile phone or other device implementing the 4G LTE communication standard. Alternatively, UE 110 may implement another standard compatible with terrestrial cellular service, such as but not limited to the 5G NR standard.

The satellite 102 provides a base station platform, in lieu of a conventional terrestrial cell phone tower and base station, for communicating with the UE 110. The base station platform provided by the satellite 102 includes both hardware and processing capability sufficient to implement the base station platform in a fashion that enables direct communication with the UE 110, with no hardware or software modifications required for standard-compliant UE 110. For example, in an embodiment in which the RAN is implemented using the 4G LTE standard, the satellite 102 hosts an Evolved Node B (eNodeB) platform.

UE 110 may establish a wireless UE-SAT link with one of the satellites 102 using a standard random access protocol of the RAN within a radio frequency (RF) band allocated for cellular communications. The cellular RF band may be allocated directly to the satellite telecommunications system 100 by a regulatory jurisdiction in which the UE 110 is located, or may be sub-allocated to the satellite telecommunications system 100 by the terrestrial telecommunications provider 200. For example, each of the satellites 102 may include one or more phased array antennas 105 for transmitting and receiving RF signals in the cellular RF band. In some embodiments, the phased array antenna 105 may include separate antenna arrays for transmitting and for receiving. Alternatively, the phased array antenna 105 may be implemented with transmitting and receiving performed by a same antenna array. In addition, the UE 110 may include a standard antenna (not shown) for off-the-shelf terrestrial user equipment, such as, for example, an internal Global System for Mobile Communication (GSM) antenna, for transmitting and receiving RF signals in the cellular RF band. However, other types of communication links are also contemplated for implementing the UE-SAT link.

The elements of the satellite telecommunications system 100 are capable of communication with each other via a mesh topology. The term "mesh topology" refers to the configuration of the elements as nodes in a mesh network. The various nodes in the mesh network coordinate with one another to efficiently route data in order to respond to requests for user data. As will be discussed in more detail herein, the configuration of the nodes in the mesh topology changes dynamically in satellite telecommunications system 100 to account for factors such as the motion of the satellites 102 relative to the Earth's surface and, in some cases, relative motion among the satellites 102. For example, as part of the network mesh topology of the satellite telecommunications system 100, certain satellites 102 may communicate directly with each other in a satellite mesh topology 107.

In addition to the satellites 102, the satellite telecommunications system 100 also includes a gateway terminal 104 on Earth. Each satellite 102 includes an onboard satellite computer system 103 programmed to manage communications with UE 110, gateway terminals 104, and other satellites 102, using one or more antennas (e.g., RF antennas and/or laser communication terminals) of the satellite. In particular, the satellite computer system 103 routes communications to and from UE 110, and to and from other nodes of the system, through the respective satellite 102 as part of the network mesh topology.

In some embodiments, in addition to providing cellular telecommunications service to UE 110, the satellite telecommunications system 100 may simultaneously provide Internet Protocol (IP) network connectivity to user terminals 112 that include a system-specific antenna. User terminals 112 may be installed at a house, a business, a vehicle (e.g., a land-, air-, or sea-based) vehicle, or another Earth-based location where a user desires to obtain communication access or Internet access via the satellites 102. An Earth-based user terminal 112 may be a mobile or non-mobile terminal connected to Earth or as a non-orbiting body positioned near Earth. For example, an Earth-based user terminal 112 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a stationary object, such as a balloon, or a mobile object, such as an automobile or an airplane.

For example, the user may connect one or more network devices 114 such as desktop computers, laptops, mobile devices, Internet of Things (IoT)-enabled devices, and the like (collectively, "customer equipment") locally to the user's user terminal 112 and obtain access via satellites 102 to the Internet. Although the local connection between the customer equipment and the user terminal is illustrated as a WiFi router 118 (or more broadly a WiFi mesh), other types of wired or wireless local communication are also contemplated.

The gateway terminal 104 serves as a satellite access gateway for the satellite(s) 102 to communicate with one or more terrestrial telecommunications providers 200. Each terrestrial telecommunications provider 200 may be an independent operator of one or more standard Earth-based telecommunications networks. In the exemplary embodiment, satellite telecommunications system 100 has no native users, but instead provides service solely through roaming relationships with the one or more terrestrial telecommunications providers 200. In other words, UE 110 are not registered and authorized directly for use on the satellite telecommunications system 100, but are registered and authorized for use on the terrestrial telecommunications provider 200 and may connect via the satellite telecommunications system 100 when connectivity to the Earth-based cellular towers associated with the terrestrial telecommunications provider 200 is unavailable or unreliable. However, embodiments are also contemplated in which the satellite telecommunications system 100 provides cellular services directly to native users, without interfacing through an independent terrestrial telecommunications provider 200.

The gateway terminal 104 may be connected to a cellular core 141 of the satellite telecommunications system 100. The cellular core 141 may be hosted at one or more terrestrial locations which may be connected to a terrestrial private network, referred to as a "private backbone" 126, of the satellite telecommunications system 100. In the exemplary embodiment, the private backbone 126 may be implemented on an Internet-based secure cloud platform, such as Microsoft Azure® or Amazon Web Services® (AWS) by way of non-limiting examples. However, other implementations of the private backbone 126 are also contemplated. In some embodiments, an instance of the cellular core 141 is co-located with each gateway terminal 104, and may be physically wired to the gateway terminal 104.

In the exemplary embodiment, the cellular core 141 hosts an aggregator node 142 that provides an interface between the satellites 102 and the core telecommunications functionality of the satellite telecommunications system 100. For example, in a 4G LTE implementation, the cellular core 141 includes Evolved Packet Core (EPC) functionality. More specifically, each satellite 102 functions as an eNodeB, and the aggregator node 142 provides an S1 interface between the eNodeBs on multiple satellites 102 and the EPC functionality. In the example, the cellular core 141 may include one or more of a Packet Data Network Gateway (P-GW) 144 of the EPC, a user plane interface S1-U to a Serving Gateway (S-GW) 146 of the EPC, and a control plane interface S1-C to a mobility management entity (MME) 148 of the EPC. It is contemplated that the cellular core 141 may provide additional or alternative core functionality, and the aggregator node 142 may provide other suitable interfaces to multiple satellites, either in a 4G LTE implementation or other RAN implementations.

In the exemplary embodiment, the P-GW 144 provides a point-of-presence on one or more ground-based IP networks 120, such as the Internet 122 or another ground-based IP network 124. For example, the "other" type of ground-based IP network 124 may represent a limited access third-party network, such as but not limited to a cloud computing data center. P-GW 144 may allocate IP addresses to the UE 110 and enable the cellular core 141 to access data from the ground-based IP network 120 (e.g., from one or more servers 150) and provide the data back through the satellite telecommunications system 100 to the UE 110.

In the exemplary embodiment, S-GW 146 provides an interface to a separate P-GW 204 of the terrestrial telecommunications provider 200. For example, in a 4G LTE implementation, the interface is an S8 interface. P-GW 204 of the terrestrial telecommunications provider 200 may cooperate with an IP Multimedia Subsystem (IMS) core 202 of the terrestrial telecommunications provider 200 to enable the terrestrial telecommunications provider 200 to independently provide UE 110 with access to the one or more ground-based IP networks 120 (such as the Internet 122). Each terrestrial telecommunications provider 200 may make arrangements with the satellite telecommunications system 100 as to whether, and in what circumstances, to provide IP network access to the UE 110 via P-GW 144 as opposed to via P-GW 204.

In the exemplary embodiment, MME 148 provides an interface to a Home Subscriber Server (HSS) 206 of the terrestrial telecommunications provider 200. For example, in a 4G LTE implementation, the interface is an S6a interface. The HSS 206 is a database including subscription information of UE 110 with the terrestrial telecommunications provider 200, as well as other information regarding UE 110.

In the exemplary embodiment, MME 148 also provides an interface to a Short Message Service Center (SMSC) 208 of the terrestrial telecommunications provider 200. For example, in a 4G LTE implementation, the interface is an SGd interface. The SMSC 208 routes text messages to and from UE 110.

The communication signal paths in the satellite telecommunications system 100 may also include a link between the user terminal 112 and one of the satellites 102 in the mesh, which may be referred to as a UT-SAT link. In the exemplary embodiment, the UT-SAT link is implemented as a Ku-band radio frequency (RF) link. For example, the user terminal 112 and each of the satellites 102 may include one or more phased array antennas for transmitting and receiving RF signals in the Ku band. In the exemplary embodiment, the phased array antenna used by the satellite 102 for communicating with the user terminals 112 is a separate antenna from the phased array antenna 105 used by the satellite 102 for communicating with the UE 110. However, other types of communication links are also contemplated for implementing the UT-SAT link, for example, other bands or other types of links including optical links. Moreover, while only one user terminal 112 and three satellites 102 are illustrated, satellite telecommunications system 100 may include millions of user terminals 112 and many thousands of satellites 102, and different ones of the user terminals 112 and satellites 102 may use different types of communication links to establish the UT-SAT link.

The illustrated communication signal paths in the satellite telecommunications system 100 include a link between the satellite 102, or one of the satellites 102 in the mesh, and the gateway terminal 104, which may be referred to as a SAT-GW link. In the exemplary embodiment, the SAT-GW link is implemented as a Ka-band radio frequency (RF) link. For example, the gateway terminal 104 and each of the satellites 102 may include a parabolic antenna for transmitting and receiving RF signals in the Ka band. However, other types of communication links are also contemplated for implementing the SAT-GW link. For example, the satellites 102 may also include laser communication terminals, as described below, and the gateway terminal 104 may also include one or more laser communication terminals for communication with the satellites 102 when atmospheric weather conditions are favorable for ground-to-space (and space-to-ground) laser transmission. Moreover, while only one gateway terminal 104 and three satellites 102 are illustrated, satellite telecommunications system 100 may include hundreds of gateway terminals 104 and many thousands of satellites 102, and different ones of the gateway terminals 104 and satellites 102 may use different types of communication links to establish the SAT-GW link.

The illustrated communication signal paths in the satellite telecommunications system 100 may further include links between respective pairs of the satellites 102 in the satellite mesh topology 107, which may be referred to as SAT-SAT links. In the exemplary embodiment, the SAT-SAT links are implemented as optical frequency links, or simply "optical" or "laser-based" links. For example, each of the satellites 102 also includes one or more laser communication terminals for transmitting and receiving laser-based (e.g., optical) signals. The laser communication terminals may be dynamically oriented with respect to the satellite 102 on which they are mounted to enable the laser communication terminals of each satellite 102 to track, and maintain the SAT-SAT links 106 with, other satellites 102 in relative motion with respect to the satellite 102. In the exemplary embodiment, each of the satellites 102 includes multiple laser communication terminals that may be independently oriented to enable each satellite to simultaneously maintain SAT-SAT links with multiple other satellites 102. However, other types of communication links are also contemplated for implementing the SAT-SAT links. Moreover, while only three satellites 102 are illustrated, satellite telecommunications system 100 may include many thousands of satellites 102, and different pairs of the satellites 102 may use different types of communication links to establish the respective SAT-SAT link between them. Additionally, one or more of the satellites 102 may not be configured to establish SAT-SAT links with other satellites 102.

In some instances, communications between the UE 110 and the cellular core 141 may be routed through a particular satellite 102 via a UE-SAT link, and through that same satellite directly to and from the gateway terminal 104 via a SAT-GW link, as shown in path A, without being routed through any other satellites 102. In other words, in some instances it is not necessary for the satellite 102 to utilize or maintain SAT-SAT links with other satellites, or even to be capable of establishing SAT-SAT links with other satellites, for the satellite telecommunications system 100 to route communications between the UE 110 and the gateway terminal 104. In other instances, communications between the cellular core 141 and the UE 110 having a UT-SAT link with the particular satellite 102 may be routed through a different satellite 102 that has established a SAT-GW link with the gateway terminal 104, as shown in path B, using one or more SAT-SAT links between the satellites 102 in the satellite mesh topology 107.

In the exemplary embodiment, satellite telecommunications system 100 also includes satellite operations ("SatOps") services 130 connected to the cellular core 141 from a centralized location. In the exemplary embodiment, the cellular core 141 is connected to the centralized SatOps services 130 via the private backbone 126. The SatOps services 130 may transmit various operational and management instructions to the cellular core 141 and the gateway terminal 104, as well as to the satellites 102 (via the gateway terminal). The SatOps services 130 may transmit various operational and management instructions to the cellular core 141.

The gateway terminal 104 may also be connected to a point-of-presence (POP) 140 on the one or more ground-based IP networks 120. For example, a dedicated PoP 140 may be co-located with each gateway terminal 104, and may be physically wired to the gateway terminal 104. The PoP 140 may access data from the ground-based IP network 120 (e.g., from one or more servers 150) and provide the data back through the satellite telecommunications system 100 to the user terminal 112 and network device 114. In addition, the POP 140 may be connected to the SatOps services 130 via the private backbone 126. The SatOps services may transmit various operational and management instructions to the gateway terminal 104, as well as to the satellites 102 (via the gateway terminal) and to the user terminals 112 (via the gateway terminal and the satellites).

In some embodiments, the POP 140 co-located with each gateway terminal 104 may be implemented on a common hardware platform with the cellular core 141 co-located with that gateway terminal 104. However, separate hardware implementations of the POP 140 and the cellular core 141 are also contemplated.

Satellite Constellation

For global coverage having reduced latency, satellite telecommunications system 100 employs non-geostationary satellites, and more specifically low-Earth orbit (LEO) satellites 102. Geostationary-Earth orbit (GEO) satellites orbit the equator with an orbital period of exactly one day at a high altitude, flying approximately 35,786 km above mean sea level. Therefore, GEO satellites remain in the same area of the sky as viewed from a specific location on Earth. In contrast, LEO satellites orbit at a much lower altitude (typically less than about 2,000 km above mean sea level), which reduces Earth-satellite signal travel time and therefore reduces communication latency relative to GEO satellites.

However, a stable low-Earth orbit necessarily corresponds to a much shorter orbital period as compared to GEO satellites. For example, at a particular altitude, a LEO satellite 102 may orbit the Earth, for example, once every 95 minutes. Further in the exemplary embodiment, the low-Earth orbits of satellites 102 are prograde. Therefore, LEO satellites do not remain stationary relative to a specific location on Earth, but rather advance generally eastward with respect to the Earth's surface. In addition, the lower orbital altitude means that, as compared to a GEO satellite, a LEO satellite has a more limited line of sight. For example, a LEO satellite in an equatorial orbit would not have a "line of sight" for direct communication with user terminals or gateway terminals at middle or upper latitudes on Earth, such as at locations L1 (corresponding to Los Angeles, California) and L2 (corresponding to Seattle, Washington) identified in FIG. 2.

Figure 2:
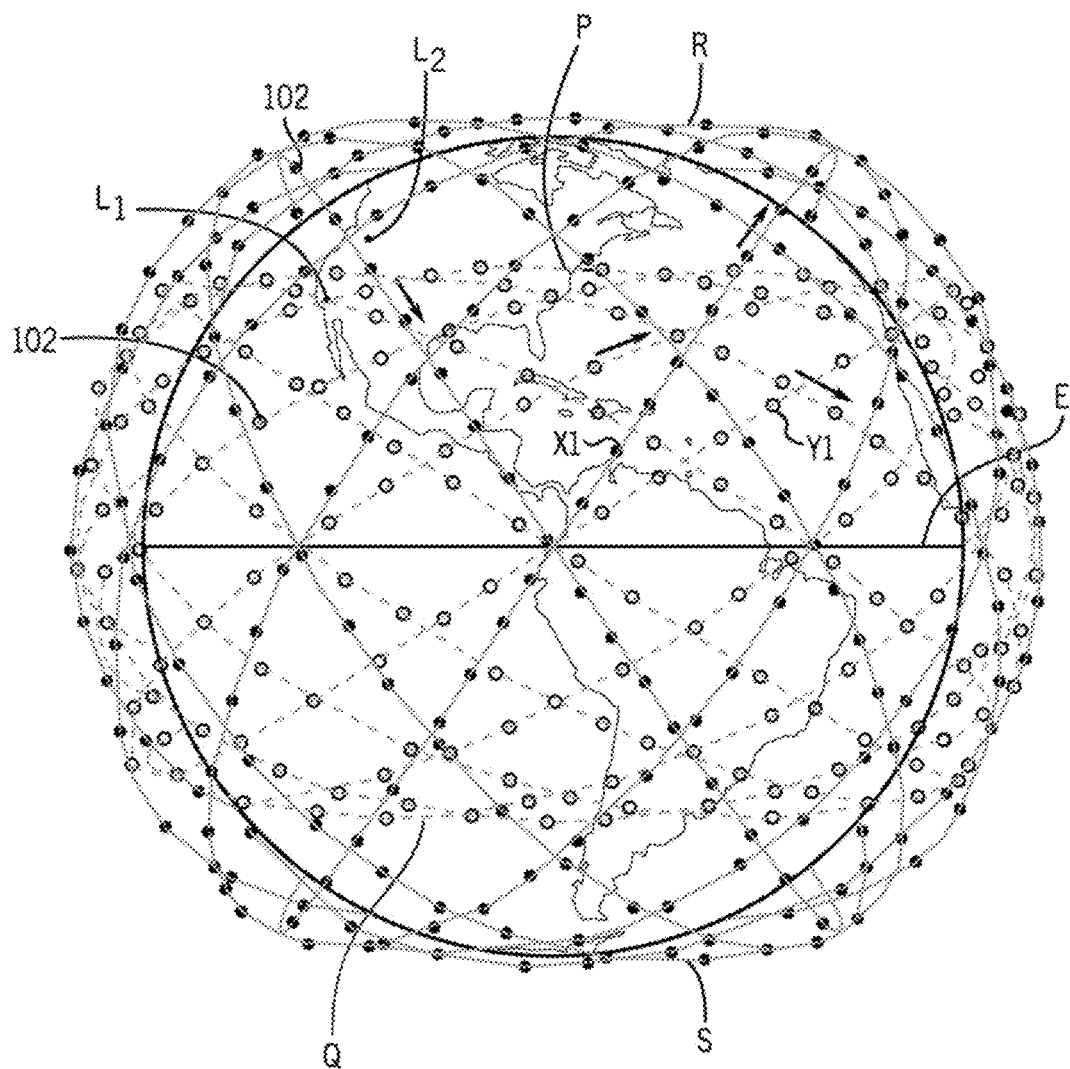
FIG. 2 is a schematic showing exemplary planar orbital patterns of a group of satellites, which may be used in the satellite telecommunications system of FIG. 1A, around a rotating Earth in accordance with embodiments of the present disclosure.

Accordingly, satellite telecommunications system 100 may include a large number, for example several thousand, satellites 102 arranged in a constellation of inclined orbits that ensures that at least some satellites 102 are always crossing the sky within range of user terminals 112 at any given Earth latitude and longitude. One non-limiting embodiment is illustrated in FIG. 2, which is a schematic showing an example of satellite planar orbital patterns X1 and Y1 of satellites 102 around a rotating Earth. In FIG. 2, the satellites in pattern X1 are represented by closed circles, and the satellites in pattern Y1 are represented by open circles, with arrows illustrating a general direction of travel of the satellites in each string. Each satellite string may include a number of equally spaced or substantially equally spaced satellites 102. More specifically, in a frame that rotates with the Earth, satellites 102 in the first string X1 are in discrete orbits sharing a first inclination, and satellites 102 in the second string Y1 are in discrete orbits sharing a second inclination different from the first inclination.

The angle of inclination of the satellites typically corresponds to an upper and lower limiting Earth latitude (indicated as P and Q for satellite string X1, and as R and S for satellite string Y1) of the orbital paths of the satellites. Although two strings at different inclinations are illustrated, other numbers of strings, such as one string or more than two strings, are also contemplated. Moreover, the illustrated angles of inclination are examples, and other angles of inclination for a single string or for multiple strings are also contemplated. Orbital patterns X1 and/or Y1 may be designed as repeating ground track systems, or may have a drifting pattern relative to the Earth's rotation rate.

Due to the inclination of the orbits, in addition to the general eastward motion of the satellites relative to the Earth's surface, each satellite 102 spends half its orbital period ascending from south to north over the Earth's surface, and the other half of its orbital period descending from north to south.

Ground Terminal Mesh Topology

Figure 3:
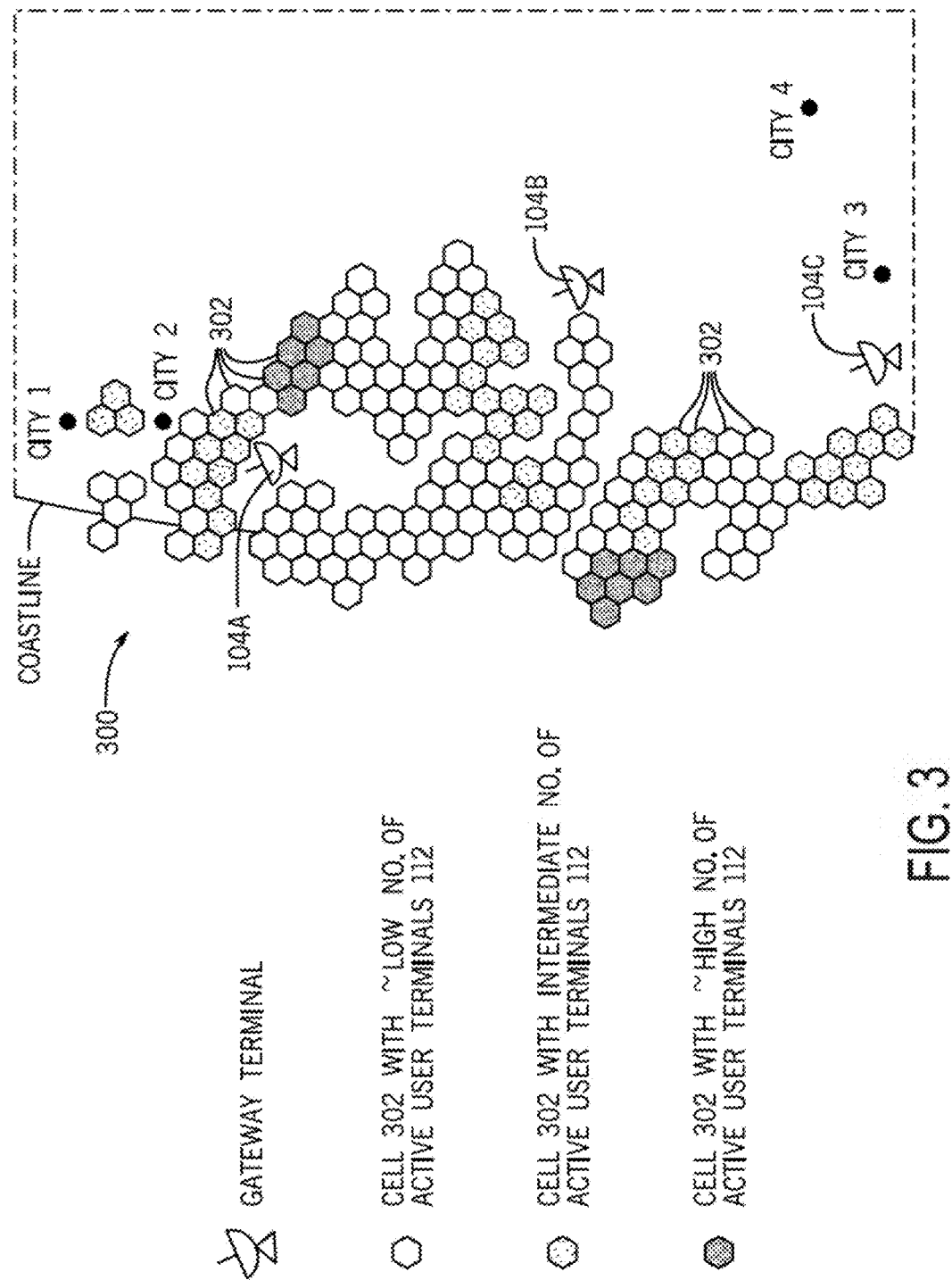
FIG. 3 illustrates a not-to-scale aerial view of an exemplary ground area that may be provided Internet service by the satellite telecommunications system of FIG. 1A, including user terminals grouped into Internet service cells, and gateway terminals.
Figure 4:
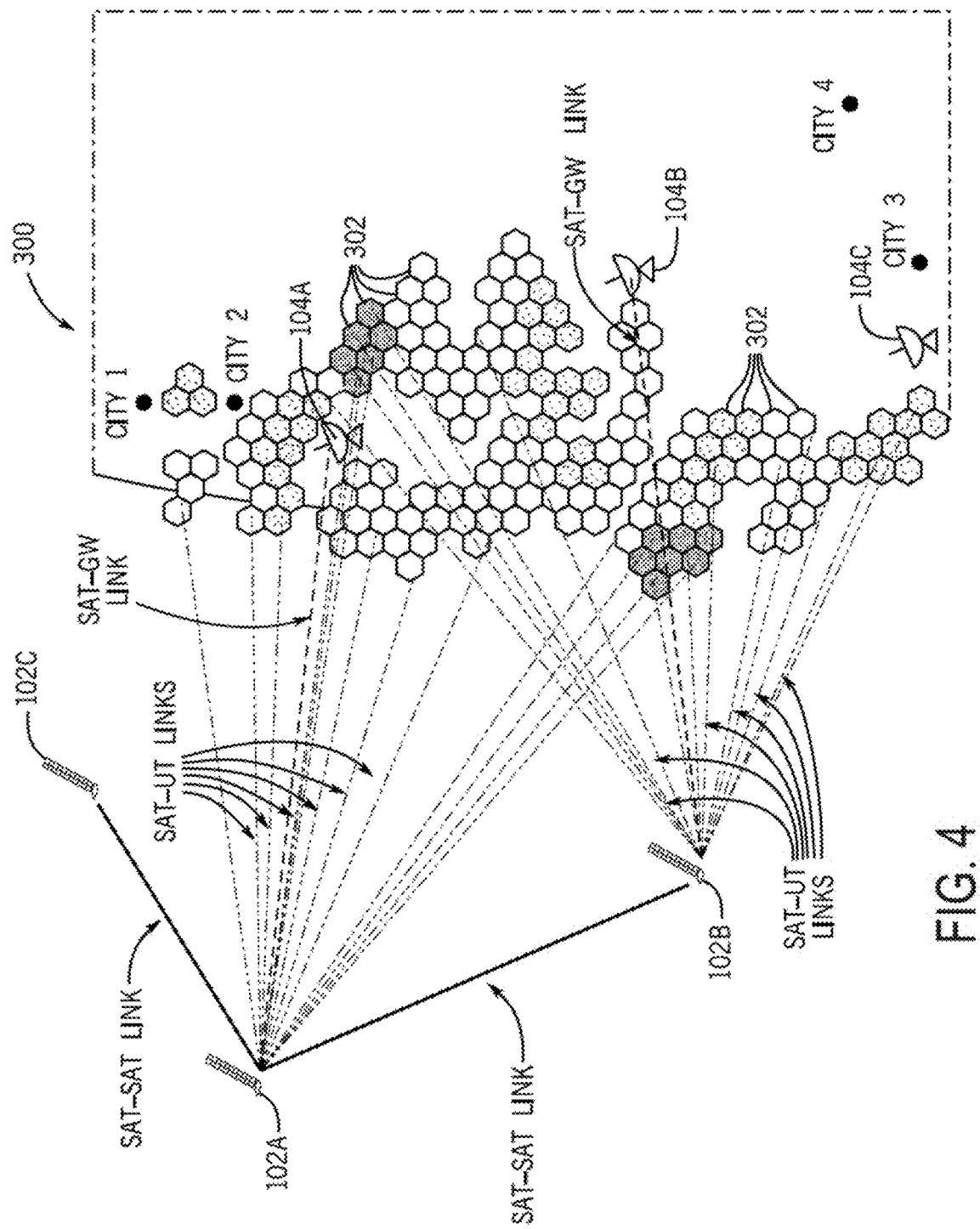
FIG. 4 illustrates a not-to-scale aerial view of the ground area shown in FIG. 3 being serviced by certain exemplary satellites of the group in communication with the user terminals and the gateway terminals.
Figure 5:
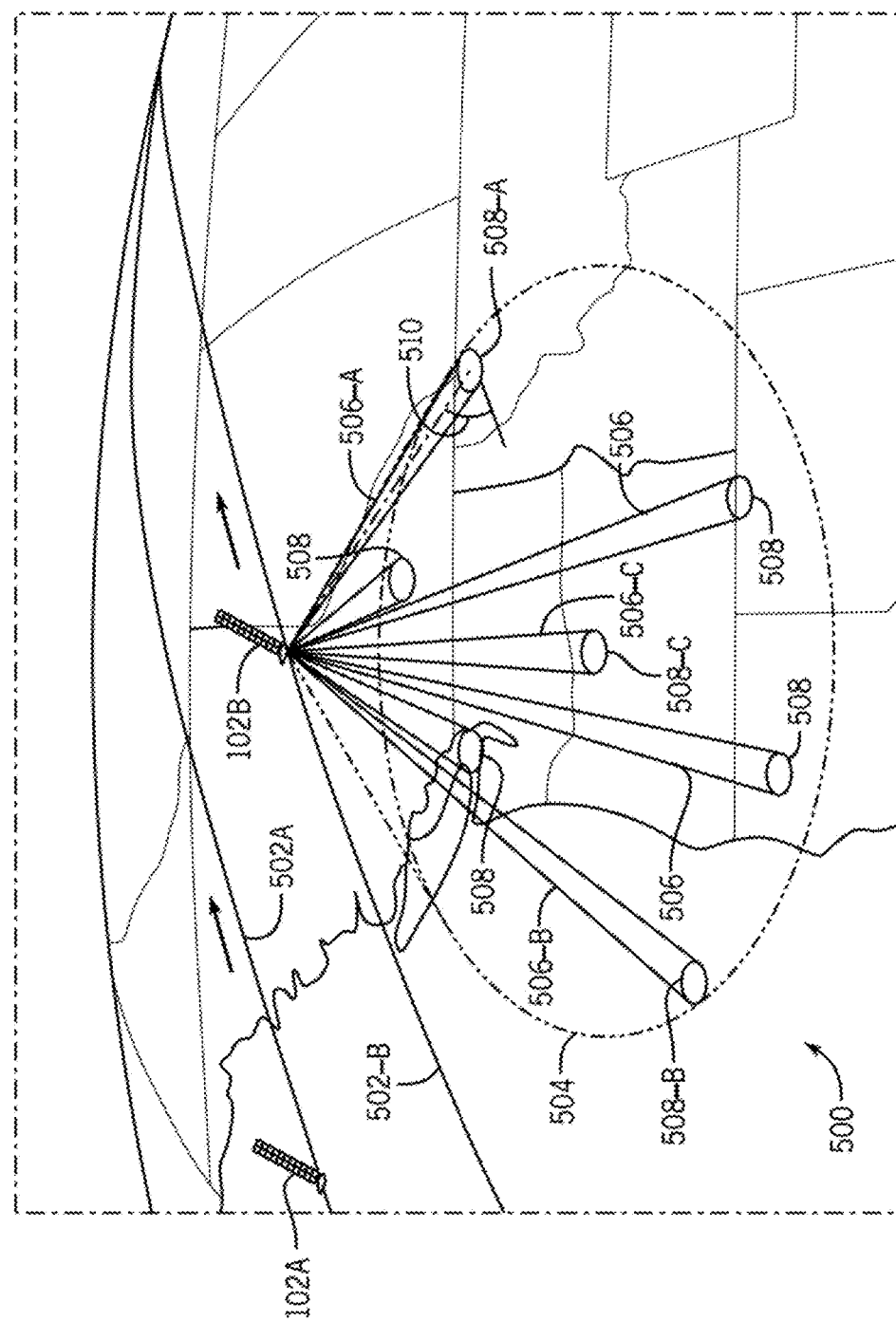
FIG. 5 illustrates a not-to-scale aerial view of an exemplary ground area that may be provided cellular communications service by the satellite telecommunications system of FIG. 1A, including beams and beam footprints of one of the satellites, in accordance with embodiments of the present disclosure.

FIG. 3 illustrates a not-to-scale aerial view of an exemplary ground area 300 that may be serviced by the satellite telecommunications system 100. More specifically, the ground area 300 may include a number of user terminals 112 that may transmit requests for user data to be serviced ultimately by, e.g., server 150 (shown in FIG. 1B) or other data sources on the ground-based IP network 120. The requests for user data, and the data responsive to the requests, may be routed to and from the user terminals via the POP 140 through the network topology of the satellite telecommunications system 100. FIG. 4 illustrates a not-to-scale aerial view of requests from, and responses to, ground area 300 via the ground-based IP network 120 being serviced by example satellites 102A, 102B, and 102C of the group of satellites 102 in communication with example gateway terminals 104A, 104B, and 104C. FIG. 5 illustrates a not-to-scale aerial view of an exemplary ground area 500 that may simultaneously be provided cellular communications service via the cellular core 141 of the satellite telecommunications system 100, including representative beams 506 and beam footprints 508 of one of the satellites 102. For example, access to the cellular core 141 may be provided to UE 110 via a first phased array antenna carried by at least a subset of the satellites 102, and access to the ground-based IP network 120 may be simultaneously provided to the user terminals 112 via a second phased array antenna carried by the satellites 102 that is physically separate from the first phased array antenna. However, embodiments are also contemplated in which the satellite telecommunications system 100 provides cellular communications service to UE 110 via the cellular core 141, but does not support separate access to the ground-based IP network 120 by user terminals 112 via the POP 140.

The network topology of the satellite telecommunications system 100 may be analogized to a map of roads (travel routes) interconnecting a group of cities (nodes). For road travel between two cities separated by a significant distance, several different road routes may be available, each using roads that connect a different set of intermediate cities. One must know which intermediate cities are connected by roads, and how much traffic there will be on each road, in order to select the best travel route between the two cities.

Similarly, for data travel between two nodes in the satellite telecommunications system 100 (e.g., between a UE 110 and a terrestrial telecommunications provider 200, or between a user terminal 112 and a data source on the ground-based IP network 120 (shown in FIG. 1B)), several different network routes may be available, each using links that connect a different set of intermediate nodes (i.e., satellites and gateways). One must know which satellites are within the field of view of the UE 110 or user terminal 112, which satellites and gateways are connected by data links, and how much traffic there will be on each link, in order to select the best data route between the UE and the cellular core 141 or between the user terminal and the PoP 140. The topology of the satellite telecommunications system 100 is more complex than a road map, however, because the "roads" (data communication routing through the mesh topology) must be frequently reconfigured to accommodate the relative motion of the satellites 102 with respect to the UE 110 and the ground terminals 112 and 104, and in some cases the relative motion of the satellites 102 with respect to each other. In some embodiments, the reconfiguration must occur once or more per minute to accommodate the relative motion of the satellites 102.

With reference to FIGS. 3 and 4, in the exemplary embodiment, the ground area 300 includes user terminals 112 grouped into IP service cells 302 that are geographically fixed relative to the Earth. Although each IP service cell 302 is illustrated as a hexagonally shaped area, IP service cells 302 of any shape are contemplated. Moreover, although the IP service cells 302 are illustrated as having a particular size, other sizes of IP service cells 302 are contemplated. IP service cell size may be a function of multiple factors including, but not limited to, altitude of the satellite constellation, number of satellites in the satellite constellation, number of Earth-based user terminals, geography, etc. The ground area 300 also includes one or more gateway terminals 104.

In some embodiments, the user terminals 112 in each IP service cell 302 are further grouped into different network traffic "lanes" within the IP service cell 302. The lanes may be, but need not be, associated with particular geographical subregions within the IP service cell 302. Each combination of an IP service cell 302 and lane may be uniquely identified in the network addressing scheme utilized by the satellite telecommunications system 100, such that all user terminals 112 in a specific IP service cell and lane can be addressed as a group. For example, if the network addressing scheme is structured similar to Internet Protocol (IP) addressing, each IP service cell and lane may be associated with a unique network address prefix.

As noted above, a PoP 140 may be co-located with each gateway terminal 104. In some embodiments, each user terminal 112 is configured to address requests for user data to a particular PoP 140 on the ground-based IP network 120, which may be referred to as the "home" POP for the user terminal. In some embodiments, the user terminals 112 are assigned to a "home" PoP 140 on a per-service cell or per-lane basis. The home PoP 140 may be assigned based on a physical proximity of the service cell to the gateway terminal 104 associated with the home PoP 140. For example, user terminals 112 in the IP service cells 302 near the top of FIG. 3 may be assigned to the POP associated with the gateway terminal 104A as their home POP, user terminals 112 in the IP service cells 302 near the middle of FIG. 3 may be assigned to the POP associated with the gateway terminal 104B as their home PoP, and user terminals 112 in the IP service cells 302 near the bottom of FIG. 3 may be assigned to the POP associated with the gateway terminal 104C as their home PoP. Alternatively, these home PoP assignments may only apply to user terminals 112 in a first lane of their respective IP service cells in FIG. 3, and user terminals 112 in a second lane of the IP service cells 302 near the top of FIG. 3 may be assigned to the POP associated with the gateway terminal 104B as their home POP, user terminals 112 in a second lane of the IP service cells 302 near the middle of FIG. 3 may be assigned to the POP associated with the gateway terminal 104C as their home POP, and user terminals 112 in a second lane the IP service cells 302 near the bottom of FIG. 3 may be assigned to the POP associated with the gateway terminal 104A as their home PoP. Other distributions of lanes within the illustrated IP service cells to home PoPs at the illustrated gateway terminals are also contemplated. The approach of assigning home PoPs based on geographic proximity tends to reduce a signal travel time through the satellite telecommunications system 100 for the requests for user data. However, other methods of assigning a "home" PoP 140 to each user terminal for the addressing of requests for user data are also contemplated. The home PoP 140 handles each request for user data by accessing resources on the ground-based network 120 or nodes of the satellite telecommunications system 100 to obtain the requested data, and by accessing the SatOps services 130 to obtain routing instructions for returning the requested data.

With reference to FIGS. 1-4, as a result of the motion of satellites 102 relative to the Earth's surface, a particular satellite 102 may be in a position to establish communication with the user terminals 112 in a particular IP service cell 302 for only a limited time window, such as less than ninety minutes, less than sixty minutes, less than thirty minutes, less than fifteen minutes, less than five minutes, or less than one minute. In the exemplary embodiment, the SatOps services 130 include a topology service 132 that assigns, to each IP service cell 302 (and in some embodiments to each lane within the IP service cell), one or more of the satellites 102 to be available for linking with the user terminals 112 on a slot-by-slot basis, in which each slot represents a period of time. The period of time, i.e., time slot length, may be selected to accommodate the limited time windows over which any particular satellite may be within the field of view of the user terminals in that IP service cell. Time slot length may be a function of orbital velocity of the satellite constellation (which in turn may be a function of altitude of the satellite constellation), number of satellites in the satellite constellation, size of the IP service cells, etc. In the exemplary embodiment, the time slot length is between 10 and 20 seconds inclusive. For example, each time slot may be 15 seconds long. However, other time slot lengths are also contemplated.

The topology service 132 may transmit topology schedule data to the user terminals 112 in each IP service cell 302 on a regular basis (e.g., via the gateway terminal 104 and the satellite 102 that are currently in communication with the IP service cell 302 associated with the respective user terminal 112). The topology schedule data transmitted to the user terminals specifies one or more of the satellites 102 that will be available for connectivity to the respective user terminal 112 during one or more future time slots. The topology schedule data may also include pointing instructions for the phased array antenna of the user terminal (or for the appropriate antenna for other types of UT-SAT links) needed to establish and maintain the corresponding UT-SAT link during the time slot, as derived from data provided by the node status service 134 for the relative motion of the satellite and the user terminal. In conjunction with the arrival of the future time slot, the user terminal 112 initiates a UT-SAT link with one of the satellites 102 specified by the topology schedule data for that time slot. In the exemplary embodiment, the SatOps services 130 also includes a steering service 136 that is programmed to manage the routing of the many data requests from, and responses to, user terminals 112 through the network topology of the satellite telecommunications system 100.

The timing of the regular transmission of the topology schedule data to the user terminals may be selected to balance several factors. For example, transmitting the topology schedule data for each time slot well in advance of the arrival of the future time slot helps to ensure that the topology schedule data propagates through the gateways and satellites to the user terminals in time to enable the user terminals to re-orient their respective phased array RF beams when the future time slot arrives. On the other hand, transmitting the topology schedule data for each time slot a relatively short time in advance of the arrival of the future time slot enables the topology service 132 to account for more up-to-date satellite and gateway statuses and ground demand data in assigning IP service cells to satellites. For example, the SatOps services 130 may include a node status service 134 that monitors the satellites 102 and gateway terminals 104. The node status service may provide projected satellite orbital positions during future time slots based on the position, velocity, and altitude of each satellite. The node status service may also provide data indicating Internet connectivity and performance of the POP 140 associated with each gateway terminal 104, and/or data indicating weather-based signal attenuation prediction data for each gateway terminal 104. The node status service 134 may further evaluate the health and operability of each satellite and gateway, for example, by tracking a slew rate and alignment performance of each parabolic antenna of the satellite or gateway to determine a current capability of the parabolic antenna to establish and track links. Other types of health and/or status monitoring of the nodes in satellite telecommunications system 100 are also contemplated. The topology service 132 may be programmed to avoid assigning a potential link between nodes if the node status data suggests the link would be unreliable. Additionally or alternatively, the topology service 132 may be programmed to assign a reliability label to a link between nodes if some node status data suggests the link would be unreliable during one or more time slots, and to include the reliability label in data provided to the steering service 136, so that the steering service 136 can take the potential unreliability of the link into account for data routing decisions during the one or more time slots.

In some embodiments, the factors involved in advance transmission timing for the topology schedule data may be balanced advantageously by regularly transmitting the topology schedule data to the user terminals in each IP service cell at an advance transmission time of five to ten minutes in advance of the one or more future time slots associated with the topology schedule data. However, other advance transmission times are also contemplated.

As discussed above with respect to user terminals, a particular satellite 102 also may be in a position to establish communication with a particular gateway terminal 104 for only a limited time window. In the exemplary embodiment, the topology service 132 also assigns each satellite 102 to one of the gateway terminals 104 on the slot-by-slot basis. The topology service 132 may transmit topology schedule data to the gateway terminals and to the satellites on a regular basis (e.g., via the gateway terminal 104 that is currently in communication with the respective satellite 102). The topology schedule data specifies an expected connectivity between each gateway terminal 104 and one or more satellites 102 during one or more future time slots. The topology schedule data transmitted to each satellite 102 may also include pointing instructions for the parabolic RF antenna of the satellite (or for the appropriate antenna for other types of SAT-GW links), and likewise the topology schedule data transmitted to each gateway terminal 104 may also include pointing instructions for the parabolic RF antenna of the gateway terminal (or for the appropriate antenna for other types of SAT-GW links), needed to establish and maintain the corresponding SAT-GW link during the time slot, as derived from data provided by the node status service 134 for the relative motion of the satellite and the gateway terminal. In conjunction with the arrival of the future time slot, the satellite 102 initiates a SAT-GW link with the gateway terminal 104 specified by the topology schedule data for that time slot.

The timing of the advance transmission may be based on advance timing factors similar to those discussed above. For example, the satellites and gateways terminals may need to receive the topology schedule data sufficiently in advance of the future time slot to calculate and execute slewing of their respective parabolic RF antennas as required by the topology schedule data for that future time slot. In some embodiments, the advance transmission time for the topology schedule data to the satellites and the gateway terminals is five to ten minutes in advance of the one or more future time slots associated with the topology schedule data. However, other advance transmission times are also contemplated.

For example, as illustrated in FIG. 4, three satellites 102A, 102B, and 102C are approaching ground area 300 at the start of a particular time slot. The IP service cells 302 in the ground area have varying numbers of active user terminals 112. The user terminals 112 in each IP service cell 302 have previously received topology schedule data for the particular time slot, specifying satellites 102A, 102B, and 102C as being available for UT-SAT links during the particular time slot. Accordingly, in conjunction with the arrival of the time slot, the various user terminals 112 in ground area 300 establish respective links with satellite 102A, 102B, or 102C for communication with satellite telecommunications system 100.

Because the user terminal 112 may independently determine which satellite to establish a UT-SAT link with, the SatOps services 130 does not know in advance which satellite 102 will be in communication with which user terminal 112. In some embodiments, each time a user terminal 112 successfully establishes a new UT-SAT link with one of the satellites 102, the SatOps services 130 associates, in a memory, the user terminal with the lane of network traffic corresponding to the current linked satellite. The SatOps services 130 provides that association as part of the network data to the steering service 136, to enable data routing through the proper current network lane back to the user terminal.

Similarly, the satellites 102A, 102B, and 102C have previously received topology schedule data for the particular time slot shown in FIGS. 3 and 4, specifying gateway terminals 104A, 104B, and 104C as being available for SAT-GW links during the particular time slot. Accordingly, in conjunction with the arrival of the time slot, the various satellites 102 establish respective SAT-GW links with gateway terminals 104A, 104B, and 104C for communication with satellite telecommunications system 100. The topology schedule data provided to the satellites 102 may specify a prioritized sequence of gateway terminals for link attempts, or may simply identify a non-prioritized list of candidate gateway terminals that are available to establish links, in which case the satellite is programmed to select for itself an order in which the satellite will attempt to establish a link with each of the listed gateway terminals.

There may be several advantages in providing the satellites 102 with more than one candidate gateway terminal 104 for establishing a SAT-GW link during a given time slot. For example, satellite 102A receives topology schedule data including a list of candidate gateway terminals 104C, 104A, and 104B, but may be blocked from establishing a high-quality link with gateway terminal 104C by weather-based signal attenuation. The list of candidates in the topology schedule data enables the satellite to quickly move to establish a link with the next candidate gateway terminal during the same time slot. In addition, there may be an upper limit on the number of SAT-GW links that can be maintained by each gateway terminal 104A, 104B, and 104C. For example, this may be due to a physical limitation on the number of satellites that can be tracked simultaneously by the parabolic RF antennas at each gateway terminal site, and some of the parabolic antennas may occasionally not track as expected for short periods. Accordingly, some satellites 102 may be blocked from linking to one or more of the candidate gateway terminals in the topology schedule data because other satellites were first to take the available channels. Again, the list of candidate gateway terminals in the topology schedule data enables the blocked satellite to quickly move to establish a link with the next candidate gateway terminal during the same time slot.

Satellite Mesh Topology

The term "satellite mesh topology" refers specifically to the network interconnectivity among the group of satellites 102 as nodes within the overall mesh network, and the configuration of the satellite mesh topology 107 changes dynamically over time in the satellite telecommunications system 100 to account for relative motion among the satellites 102 and other factors.

One factor that affects the satellite mesh topology 107 is that each satellite 102 can only link directly to a limited number of other satellites 102 at any given time, due to each satellite 102 having a finite number of laser communication terminals (and/or other SAT-SAT communication devices). In other words, at any given time, each satellite 102 is capable of establishing a direct network connection to only a few other satellites 102 out of potentially thousands of satellites in the constellation. In one embodiment, each satellite 102 has five laser communication terminals available to link to other satellites 102. However, embodiments in which one or more of the satellites 102 has a different number of laser communication terminals (or a different number of other SAT-SAT communication devices) are also contemplated.

In the exemplary embodiment, the topology service 132 assigns SAT-SAT links among pairs of satellites 102 on the slot-by-slot basis. The topology service 132 may include the link assignments in the topology schedule data transmitted to each satellite 102 on the regular basis, as discussed above (e.g., via the gateway terminal 104 currently in communication with the respective satellite 102). More specifically, the topology schedule data may specify a connectivity of the respective satellite 102 to other satellites in the satellite mesh topology 107 during the one or more future time slots. The topology schedule data may also include pointing instructions for each of the satellite's laser communication terminals (or for the appropriate antenna for other types of SAT-SAT links) needed to establish and maintain the specified SAT-SAT links during the time slot, as derived from data provided by the node status service 134 for the relative motion of the pair of satellites. In conjunction with the arrival of the future time slot, the satellite computer system 103 dynamically establishes SAT-SAT links with the other satellites specified by the topology schedule data for that time slot, as well as the SAT-GW link with the gateway terminal 104 specified for that time slot.

In the exemplary embodiment, the topology service 132 is programmed to select SAT-SAT links for the satellite mesh topology 107 for each time slot in a way that increases (for example, maximizes or approximately maximizes) the interconnectivity of the satellites 102 via the SAT-SAT links. For example, the topology service 132 may be programmed to attempt to meet a constraint that every satellite 102 has a communication path through the satellite mesh topology 107 to every other satellite 102 during every time slot. In other words, if the constraint is met, a communication between any two satellites 102 can be routed using solely SAT-SAT links, if desired, with no need for routing through ground terminals. For another example, if complete interconnectivity among the satellites cannot be achieved for a time slot, the algorithm that selects among alternative SAT-SAT link maps for the satellite mesh topology may be programmed to assign a beneficial weight to SAT-SAT link maps in proportion to a degree to which they approach complete interconnectivity. However, embodiments are also contemplated in which complete interconnectivity, or a higher degree of interconnectivity, among the satellites is not weighted as heavily in assigning the satellite mesh topology 107.

Another factor that affects the satellite mesh topology 107 is that a satellite cannot switch a SAT-SAT link instantaneously from one satellite to another, due to physical constraints. For example, the laser communication terminal on the satellite may, in some circumstances, require a few seconds to slew into position and acquire a necessary alignment to establish network communication with the laser communication terminal of the satellite to be linked. Another factor that affects the duration of each SAT-SAT link is that reliable links can typically be established only within a limited physical distance range between the satellites, due to parameters such as a line-of-sight requirement for laser-based links and/or tracking and pointing accuracy limitations of the laser communication terminals. In some embodiments, reliable SAT-SAT links are possible only between LEO satellites that are within a distance range from about 400 kilometers (about 250 miles) to about 2500 kilometers (about 1,500 miles). Satellite velocity is another factor that affects the duration of each SAT-SAT link. In particular, reliable communication links between each satellite 102 and other satellites 102 can typically be established only within a threshold relative velocity between the satellites. For example, the laser communication terminals on a first satellite 102 may not be able to reliably track and point at a second satellite 102 as that second satellite moves at a high relative velocity through the first satellite's field of view, even if the distance between the first and second satellites is within the limited physical distance range. Yet another factor that affects the duration of each SAT-SAT link, as well as the overall network topology, is satellite altitude. Satellites 102 within the constellation may be placed at differing orbital altitudes, for example within an altitude band about a nominal altitude of the satellite string. Satellites 102 have different velocities at different orbital altitudes. Thus, satellites 102 in relatively close proximity at a certain time, and moving in the same general direction, but at different ends of the orbital altitude band tend to separate from each other over a relatively short time as compared to satellites 102 in relatively close proximity at a certain time, moving in the same general direction, and at close to the same altitude. Still another factor that affects the satellite mesh topology 107 is the differing demand levels from user equipment user terminals 112 in different IP service cells 302 during each time slot, or from UE 110 in different geographical sub-areas that may be covered by the cellular RF beams of each satellite. SAT-SAT links may be assigned in part based on satellite positions relative to one or more IP service cells 302, clusters of UE 110, or gateway terminals 104. For example, satellites 102 passing over a high-demand ground area (e.g., a geographic area that includes a high density of active UE 110 or IP service cells 302 having a relatively high density of active user terminals 112) during a time slot may be preferentially linked to satellites passing over nearby lower-demand ground areas, in order to give the steering service 136 more opportunities to distribute data routing for the high-demand ground area among a broader range of network paths with only small increases in communication latency. The topology service 132 may be programmed to evaluate one or more of the factors above in determining the SAT-SAT link topology schedule data for each of the time slots. For example, as discussed above, the node status service 134 may provide status data, e.g., position, velocity, altitude, health, and operability, of each satellite, which may include tracking a slew rate and alignment performance of each laser communication terminal on the satellite to determine a capability of the terminal to acquire and maintain reliable links. The topology service 132 may use such data from the node status service 134 in selecting the satellite mesh topology 107 for each time slot.

As noted above, the topology service 132 may be programmed to transmit the SAT-SAT link topology schedule data to the satellites on the same regular basis, such as five to ten minutes in advance of the one or more future time slots, as is used to transmit general mesh topology schedule data to the nodes. However, other advance transmission times are also contemplated.

Cellular RF Beam Mapping

Returning to FIG. 5, as noted above, the satellites 102 may also provide cellular communications service to the ground area 500 via the cellular core 141 of the satellite telecommunications system 100. The ground area 500 may be co-extensive with, or overlap, the ground area 300 in which user terminals 112 are serviced. For example, access to the cellular core 141 may be provided to UE 110 via a first phased array antenna 105 carried by at least a subset of the satellites 102, and access to the ground-based IP network 120 may simultaneously be provided to the user terminals 112 via a second phased array antenna (not shown) carried by the satellites 102 that is physically separate from the first phased array antenna. Alternatively, the ground area 500 may not overlap with ground area 300 or may not include any user terminals 112 serviced by the satellites 102. In some embodiments, for example, the satellites 102 support access to the cellular core 141 by UE 110 in the ground area 500, but do not support separate access to the ground-based IP network 120 by user terminals 112.

In FIG. 5, satellites 102A and 102B are moving generally northeast over the ground area 500 along respective orbital paths 502A and 502B, with the satellite 102A slightly behind and to the north of the satellite 102B. As shown in FIG. 4, three gateway terminals 104A, 104B, and 104C are available to establish SAT-GW links with the satellites 102A and 102B as they pass over the ground area 500, and each satellite 102A and 102B may establish a SAT-GW link for each time slot as directed by the topology schedule data.

In the exemplary embodiment, each of the satellites 102 implements a base station platform that supports multiple cells, and the carrier for each cell is implemented by a corresponding RF beam 506 of the phased array antenna 105. For example, in a 4G LTE implementation, the satellite base station platform is an eNodeB that supports up to 256 cells (also referred to as sectors), and the phased array antenna 105 (or, optionally, plurality of phased array antennas 105) of the satellite generates up to 256 separate directional RF beams 506 as the carriers for each cell (although only seven beams 506 are illustrated in FIG. 5 for clarity of illustration). However, other numbers of beams/ cells per satellite 102 are also contemplated, either in a 4G LTE implementation or other RAN implementations. Each beam 506 intersects the surface of the Earth at a centerline incidence angle 510 and has a corresponding beam footprint 508 at or near the surface. The beam footprint 508 defines a service area of the cell, such that UE 110 in the beam footprint 508 are able to access the satellite telecommunications system 100 using the corresponding beam 506. The eNodeB implemented by the satellite routes communications with the UE 110 in each beam footprint through the satellite's current SAT-GW link and the cellular core 141, as shown in FIG. 1B.

As the satellite 102B passes over the ground area 500, the position of each UE 110 on the surface constantly changes relative to the position of the satellite 102B. In the exemplary embodiment, the topology service 132 of the SatOps services 130 includes a cellular planning component programmed to compensate for the relative motion of the satellites in order to ensure continued connectivity of the UE 110. For example, at the moment in time illustrated in FIG. 5, the satellite 102B has a field of regard 504, which is an area that the phased array antenna 105 can potentially reach with directional beams 506. The beams generated by the satellite include a forwardmost beam 506-A with a footprint 508-A, a rearmost beam 506-B with a footprint 508-B, and a nadir beam 506-C with a footprint 508-C. (Additional beams generated by the satellite are not illustrated in FIG. 5 for purposes of clarity of illustration.) As the satellite 102B moves onward, if there is no adjustment in the direction of emanation of the beams 506 from the satellite 102B, the beam footprint 508-A will move away from the UE 110 that were communicating via the beam 506-A, the beam footprint 508-B will move away from the UE 110 that were communicating via the beam 506-B, and the beam footprint 508-C will move away from the UE 110 that were communicating via the beam 506-C.

In some embodiments, in order to provide continued connectivity to the UE 110 in each geographic sub-area of the ground area 500, the beams 506 may be re-directed (that is, the beam angle from the phased array antenna 105 may be changed) to keep the footprint 508 on the same sub-area as the satellite 102B moves along the path 502. This may be referred to as steering or "sliding" the beams. For example, the incidence angle 510 of the beam 506-A would steadily approach 90 degrees as the satellite 102 moves towards a position directly over the geographic sub-area covered by beam footprint 508-A in FIG. 5, and then continue to grow steadily past 90 degrees towards 180 degrees as the satellite moves away to the northeast, such that the beam footprint 508-A remains located on the same geographic sub-area throughout the pass through the satellite's field of regard 504.

Additionally or alternatively, the beams 506 may be held at a constant beam angle from the phased array antenna as the satellite 102B moves overhead, and communication with the UE 110 may be handed over to a different beam 506 with a footprint 508 that moves over the geographic sub-area as the footprint of the initial beam leaves the sub-area. This may be referred to as "gliding" the beams. For example, the geographic sub-area initially covered by beam footprint 508-A (at the instant in time shown in FIG. 5) would eventually be covered by beam footprint 508-C as the satellite moves directly overhead, and then covered by beam footprint 508-B just before the geographic sub-region is left behind by the field of regard 504 as the satellite 102B moves away. (The geographic sub-area would also be covered by intermediate beam footprints 508 distributed between footprints 508-A and 508-C, and between 508-C and 508-B, associated with beams 506 that are not included in FIG. 5 for purposes of clarity of illustration.) The UE 110 in that geographic sub-area may be handed over to the next following beam in sequence as each successive beam footprint covers the sub-area. As the final footprint 508-B for the satellite leaves the geographic sub-area, the UE 110 in the sub-area may next be handed over to a beam of the next following satellite 102A in the group of satellites 102, and so forth.

In some gliding beam implementations, the satellites 102 may utilize one or more standard handover procedures associated with the RAN implementation to pass the UE 110 in the geographic sub-area from beam to beam as the satellites move overhead. For example, each beam originating from a satellite is a defined cell of the same base station platform, and handovers between beams of the same satellite 102 (i.e., intra-satellite handovers) may be accomplished without involvement of the cellular core 141. Likewise, the beams from different satellites communicating with the same cellular core 141 are defined as cells of the same RAN, and within-network handover procedures may be used. In a 4G LTE implementation, such handovers may be accomplished using the X2 or S1 interfaces.

In some embodiments, the topology service 132 may use a dynamic combination of sliding (that is, steered) and gliding beams to meet requirements for cellular services requested by UE 110 within the ground area 500, under constraints imposed by the network topology considerations discussed above and, in some cases, by a concomitant need to meet independent data flow requirements to and from user terminals 112 using the same satellites 102 and gateway terminals 104. More specifically, the topology service 132 may allocate a direction and power of the available beams of the phased array antenna 105 of each satellite 102 on the slot-by-slot basis, as discussed above, to ensure coverage of active UE 110 in the geographic sub-areas within the field of regard 504 during the time slot. The topology planning service may also ensure that the network topology for the time slot includes sufficient backhaul capacity for cellular communications data from the satellites 102 through the gateway terminals 104 (potentially using the satellite mesh topology 107 as an intermediate link) to the cellular core 141. The topology service may transmit, via the gateway terminals 104, SAT-GW link instructions, SAT-SAT link instructions, and beam plan instructions for each time slot to the satellites 102 as part of the topology schedule data. The beam plan instructions may be used by the satellite computer system 103 to command the phased array antenna 105 to generate the beams 506 during each time slot in accordance with the beam direction and power allocations determined by the topology service 132.

Mapping Geographic Areas to Satellite-Implemented Base Station Platforms

In a typical terrestrial RAN, the RAN protocol includes an addressing scheme to enable the cellular core 141 to track the base station to which each UE 110 is connected, to enable routing of data (for example, an incoming telephone call) that is addressed to the UE 110. For example, each terrestrial telecommunications provider 200 (shown in FIG. 1B) can be assigned a unique provider identifier. An example of the provider identifier is a Public Land Mobile Network (PLMN) identifier, which includes a Mobile Country Code (MCC) unique to each country in the world and a Mobile Network Code (MNC) unique to the terrestrial telecommunications provider 200 within the country. The satellite telecommunications system 100 can use the provider identifier of an associated terrestrial telecommunications provider 200 in a partnership arrangement, or can use its own provider identifier if it is operating as an independent provider of telecommunications services. Other implementations of a provider identifier are also contemplated.

The RAN protocol typically also provides a localized identifier for addressing UE 110 within localized geographic areas covered by the provider identifier. An example of localized identifiers is the use of Tracking Areas in the 4G LTE protocol. One or more cells can be grouped into a Tracking Area, and each Tracking Area can be identified, uniquely within the network, by a Tracking Area Code (TAC). In other words, the TAC, combined with the provider identifier (that is, the MCC and MNC), forms a globally unique Tracking Area Identifier (TAI) for a corresponding Tracking Area.

Each base station platform (for example, each eNodeB in the 4G LTE implementation) typically broadcasts the provider identifier, along with the localized identifier to which it is assigned by the provider. When one of the UE 110 successfully establishes communication with the base station platform, the base station platform can inform the cellular core 141 that the UE 110 is present in the area associated with the localized identifier (for example, the Tracking Area). The cellular core 141 can pass the UE's location (for example, the TAI) to the terrestrial telecommunications provider 200. When the terrestrial telecommunications provider 200 receives data (for example, an incoming call or SMS text message) addressed to that UE 110, the data can be routed to the UE 110 using the TAI. Other implementations for the localized identifier are also contemplated.

In some RAN implementations, when the UE 110 leaves communication with the base station from which it received the localized identifier (for example, due to movement of the UE 110) and is handed off to a second base station platform with a different localized identifier, a location update procedure must be performed through the cellular core 141 to associate the UE 110 with the different localized identifier (for example, in order to enable the cellular core 141 to more quickly locate the UE 110 if the cellular core 141 receives data addressed to the UE 110). The location update procedure can be viewed as an overhead cost on the resources of the RAN because it diverts available bandwidth of the base station platform and the cellular core away from user data flow. However, some RAN protocols enable the UE 110 to be associated not just with the localized identifier of the base station platform to which it first connects, but with a group of localized identifiers. For example, in the 4G LTE protocol, the base station platform can provide, to each UE 110 when it initially connects to the RAN, a Tracking Area List (TAL) of up to 16 Tracking Areas. The UE 110 does not need to initiate the location update procedure, referred to in 4G LTE as a Tracking Area Update (TAU), when it moves into a different Tracking Area that is included in the TAL it received upon connection to the first base station. However, if the UE 110 has moved to a different TAC within the TAL, the cellular core 141 may subsequently have to page the UE 110 across one or more of the TACs in the TAL until the UE 110 is located. Paging also can be viewed as an overhead cost on the resources of the RAN because it too diverts available bandwidth of the base station platforms associated with each paged TAC, and of the cellular core, away from user data flow. Selection of the groupings of localized identifiers, on a per-base station or per-UE basis, can be used to balance a reduction of overhead from the location update procedure against an increase in overhead from paging the localized areas within the grouping.

It should be recognized that typical terrestrial RANs are implemented by stationary base stations that are each physically associated with respective localized areas. In other words, the terrestrial base station always covers the same localized identifier in terms of geography. In contrast, the satellite telecommunications system 100 includes base stations implemented on LEO satellites 102 that successively pass over, and then exit, the ground area 500 on a time scale of a few minutes or less. Accordingly, even a stationary UE 110 may need to be handed over several times to different base station platforms (each implemented by the satellite computer system 103 of a different satellite) in succession over a time period of less than an hour.

In some embodiments, the satellite telecommunications system 100 introduces a level of abstraction into the localized identifiers to reduce a need for location update procedures by the UE 110 each time a connection is made with a base station platform implemented by a different satellite. Moreover, the level of abstraction can be configured to be invisible to the UE 110, such that the UE 110 configured for operation with a conventional terrestrial RAN protocol are capable of operating seamlessly with the satellite telecommunications system 100. More specifically, the satellite telecommunications system 100 can assign virtual localized identifiers to geographic sub-areas, and can instruct each satellite 102 scheduled to direct a beam 506 to a particular sub-area to broadcast, while the beam footprint 508 is on the geographic sub-area, the virtual identifier of that particular sub-area as the RAN protocol localized identifier on that beam 506.

Figure 6:
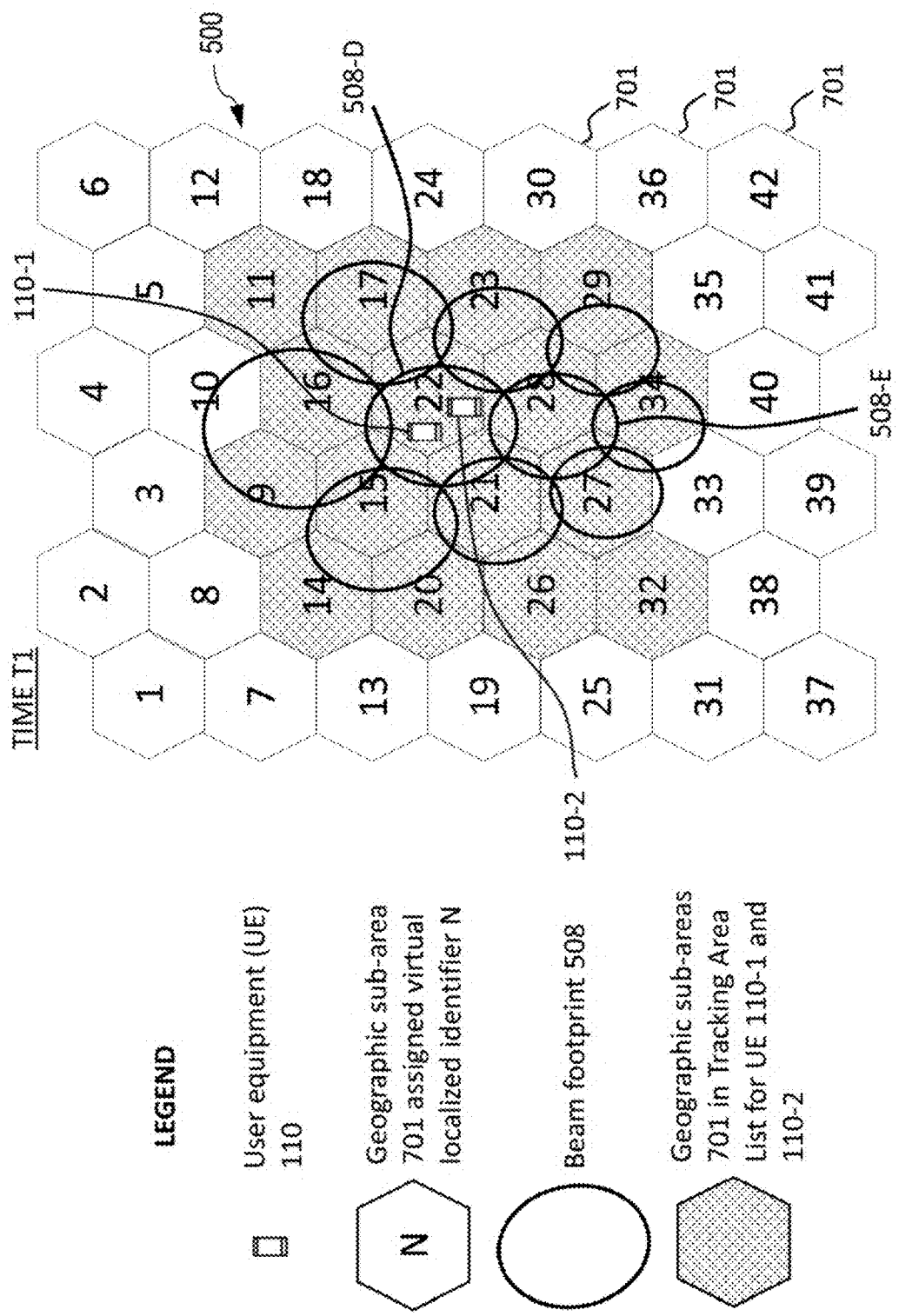
FIG. 6 illustrates an example placement, at a first time, of beam footprints on geographic sub-areas within a portion of the ground area shown in FIG. 5.

FIG. 6 illustrates an example placement, at a first time T1, of beam footprints 508 on geographic sub-areas 701 within a portion of the ground area 500. The geographic sub-areas 701 are fixed with respect to the Earth's surface. In other words, a particular fixed geographic sub-area 701 can be successively covered at different times by the beam footprints 508 of different beams 506 generated by different satellites 102 as the satellites successively pass over the ground area 500 in low Earth orbit.

In some embodiments, each geographic sub-area 701 is assigned a virtual localized identifier, formatted according to the RAN protocol requirements for the localized identifier. The virtual localized identifier remains associated with the corresponding geographic sub-area 701 across time, regardless of which satellites 102 are overhead and directing a beam 506 towards that geographic sub-area 701. Stated another way, the virtual localized identifier is a property statically associated with the corresponding geographic sub-area 701, rather than with the hardware of a particular base station platform. The virtual localized identifier is then temporarily assigned to be broadcast by a beam 506 of a particular base station platform over the course of, for example, a few minutes while the implementing satellite 102 passes overhead in low Earth orbit and directs that beam 506 to the geographic sub-area 701; when that satellite moves out of range of the geographic sub-area 701, the virtual localized identifier is re-assigned to be broadcast by a beam 506 of the next incoming satellite 102 while it passes overhead and directs that beam 506 to the geographic sub-area 701, and so on.

In certain embodiments, the satellite telecommunications system 100 uses the 4G LTE RAN protocol, and the localized identifier is the Tracking Area Code (TAC) as discussed above. The TAC is defined as a 16-bit unsigned integer (and thus can range in value from 0 to 65,535). However, other RAN protocols or other types of localized identifier are contemplated.

For convenience, the illustrated geographic sub-areas 701 are illustrated as being associated with virtual localized identifiers in sequence from 1 to 42. However, other values for the virtual localized identifiers are contemplated and the virtual localized identifiers need not be in any sequence. The virtual localized identifiers can be, but need not be, formatted identically to the physical localized identifiers to which they are mapped. For example, as discussed above, in certain embodiments, the satellite telecommunications system 100 uses the 4G LTE RAN protocol, and the broadcast physical localized identifier is the Tracking Area Code (TAC), which must be a 16-bit unsigned integer (and thus can range in value from 0 to 65,535). Correspondingly, the virtual localized identifiers can also be 16-bit unsigned integers. For example, the physical localized identifier assignments can provide for a direct insertion of the 16-bit unsigned integer virtual localized identifier into the data location for the TAC in the RAN parameter information broadcast on the corresponding beam. Alternatively, the mapping of physical localized identifiers to virtual localized identifiers can include a transformation from a different format for the virtual localized identifiers into the 16-bit unsigned integer format of the physical localized identifiers. For example, the physical localized identifier assignments can provide a 16-bit unsigned integer value for insertion into the data location for the TAC that is a transformation of, or other mapping from, the differently formatted virtual localized identifier.

FIG. 6 also illustrates, via a pattern fill of the corresponding geographic sub-areas 701, the group of localized identifiers assigned to UE 110 that connect to the RAN on any beam 506 that broadcasts the physical localized identifier associated with the virtual localized identifier 22, such as the UE 110-1 and 110-2. In the illustrated example, the RAN is implemented as 4G LTE and the group of localized identifiers is the TAL, which can include up to sixteen TACs.

Several considerations can affect the selection of an advantageous size for the geographic sub-areas 701. For example, a relatively larger size for the geographic sub-areas 701 increases a likelihood that a moving UE 110 remains within the boundaries of the virtual localized identifier associated with a single geographic sub-area 701, or within the boundaries of a group of localized identifiers including the single geographic sub-area 701. Therefore, a larger size can tend to reduce overhead as discussed above by reducing the number of location update procedures on the satellite telecommunications system 100. On the other hand, if the geographic sub-areas 701 are larger than the typical size of the beam footprints 508, any paging for a UE 110 transmitted to the associated localized identifier will induce paging activity on all beams 506 with footprints assigned to any portion of the geographic sub-area 701. Therefore, a size that is too large can increase overhead as discussed above by tending to increase an amount of paging activity on the satellite telecommunications system 100.

In some embodiments, the size of the geographic sub-areas 701 is selected to ensure that a UE 110 that is stationary with respect to the Earth will never have to initiate the location update procedure (for example, a Tracking Area Update in 4G LTE), regardless of the fact that the satellite-based base station platforms are moving with respect to the UE's stationary location. The size can also ensure that moving UE 110 can still trigger the location update procedure in order to prevent paging overhead from becoming too large. More specifically, a minimum size of the geographic sub-areas 701 required to achieve this goal can be derived from a maximum possible extent of the beam footprints 508 (a property which emerges from the physical beam geometry) and a number of localized identifiers (for example, TACs) that can be included in the group of localized identifiers (for example, the TAL) assigned to the UE 110.

With respect to the maximum possible extent of the beam footprints 508, a shape and size of the beam footprints 508 can change as the satellite 102 moves over the ground area 500, particularly in a primarily "sliding" (steered) beam approach as discussed above, because the elongation of the beam footprint 508 changes as the incidence angle 510 (shown in FIG. 5) changes. In the illustrated embodiment, the beams 506 have a generally circular cross-section normal to the direction of travel, and as a result the beam footprints 508 are generally elliptical or ovoid shaped. For example, the nadir beam 506-C (shown in FIG. 5) can have a generally circular beam footprint 508-C, while the beam footprints 508 of other beams 506 are correspondingly elliptical or ovoid in proportion to an extent that the centerline incidence angle 510 differs from 90 degrees. The maximum extent of the beam footprint occurs when the beam footprint 508 is at its most elongated, that is, typically when the corresponding beam is directed an edge of the field of regard 504 of the satellite 102. For example, beam footprints 508-A and 508-B (shown in FIG. 5) are elongated to their maximum extent because beams 506-A and 506-B are directed to edges of the field of regard 504. However, other shapes for the beams 506 and beam footprints 508 are also contemplated.

Figure 8:
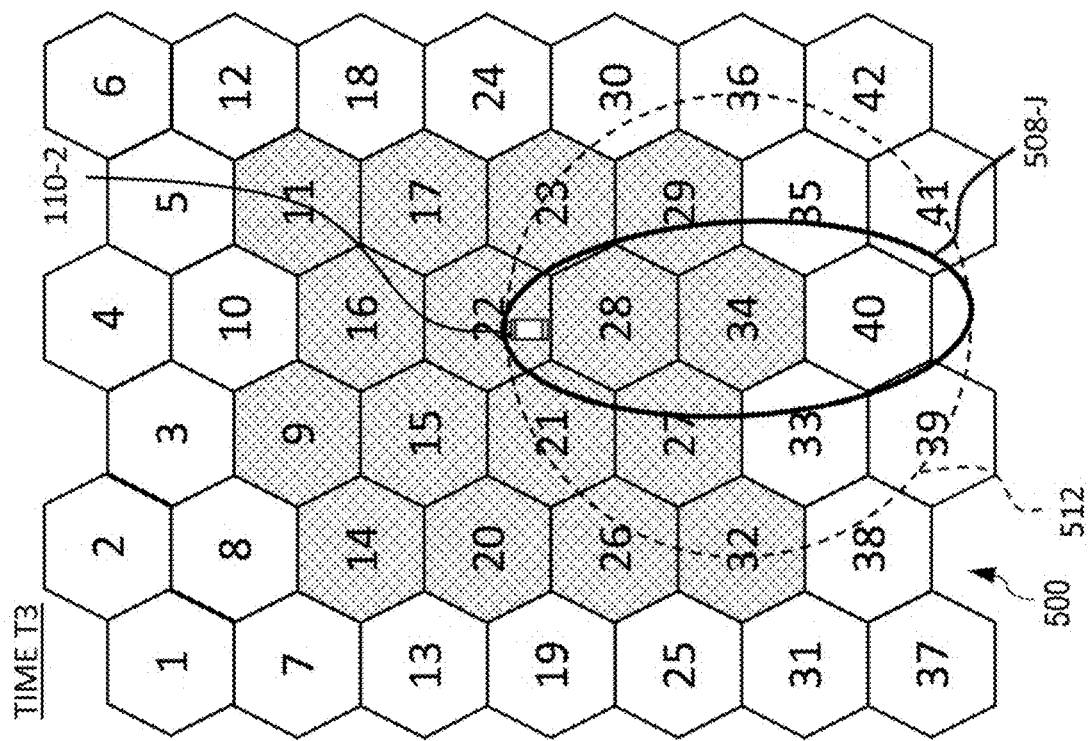
FIG. 8 is another schematic illustration of a relationship between the maximum extent of a beam footprint and the size of the geographic sub-areas shown in FIG. 6.
Figure 7:
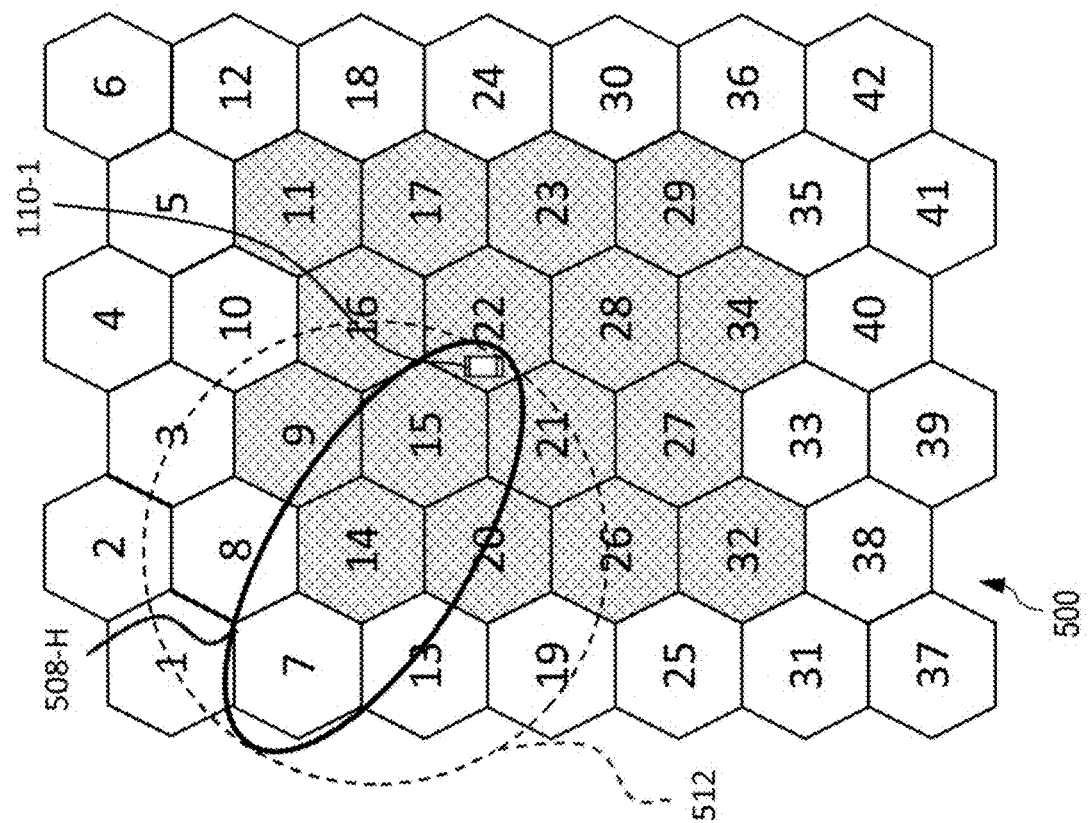
FIG. 7 is a schematic illustration of a relationship between a maximum extent of a beam footprint and a size of the geographic sub-areas shown in FIG. 6.

FIG. 7 and FIG. 8 are schematic illustrations of a relationship between a maximum extent 512 of a beam footprint 508 from the center of the beam footprint, and a size of the geographic sub-areas 701, within the ground area 500 of FIG. 6. For any beam footprint 508-H centered on the geographic sub-area 701 associated with the virtual localized identifier 14, the maximum extent 512 lies along the dashed circle illustrated in FIG. 7. (In other words, the beam footprint 508-H could be rotated in the plane of the page about its center, corresponding to a different position of the beam footprint around the perimeter of the field of regard 504 (shown in FIG. 5), but if it is centered on the geographic sub-area 701 associated with the virtual localized identifier 14, its elongated edges will fall on the dashed circle.) Similarly, for any beam footprint 508-J centered on the geographic sub-area 701 associated with the virtual localized identifier 34, the maximum extent 512 lies along the dashed circle illustrated in FIG. 8.

With respect to the number of localized identifiers in the group of localized identifiers, for simplicity in the discussion that follows, the group of localized identifiers will be embodied by the TAL, which can include up to 16 TACs. However, the discussion also applies to other embodiments of the group of localized identifiers having other maximum numbers of localized identifiers. A TAL having the maximum number of localized identifiers can be pre-defined and associated with each virtual localized identifier, such that any UE 110 that connects on a beam 506 broadcasting the corresponding physical TAC will receive that TAL. For example, the base station platform implemented by the satellite computer system 103 can transmit the TAL associated with each TAC to the UE 110 when the UE 110 connects to the physical beam that is currently mapped to that TAC. Moreover, the localized identifiers in each TAL can be assigned to correspond to geographic sub-areas 701 that are distributed evenly around the geographic sub-area 701 corresponding to the virtual localized identifier associated with the TAL. Note that "distributed evenly" does not require a perfectly even distribution, as it may not be possible to arrange the number of areas in the list perfectly around a "center" TAC, and more than one arrangement may be possible for an even distribution. For example, in FIGS. 6-8, the TAL associated with the virtual localized identifier 22 includes the 16 geographic sub-areas 701 arranged as evenly as possible in all directions around the geographic sub-area 701 associated with the virtual localized identifier 22, rather than, for example, including geographic sub-areas 701 elongated along one row or column of geographic sub-areas 701. Note that more than one arrangement of the TACs in the TAL could satisfy the "even" distribution of 16 TACs. For example, virtual TACs 14, 20, 26, and 32 could be replaced in the illustrated TAL by virtual TACs 18, 24, 30, and 36, and the same result of an even distribution would obtain.

Based on the maximum extent 512 and the number of TACs in the TAL, the size of the geographic sub-areas 701 can be selected so that a stationary UE 110 that connects at any location within the geographic sub-area 701 can only be covered by the beam footprints of beams associated with the TAL provided to the UE 110 in that geographic sub-area 701. Stated another way, the constraint is that the geographic sub-areas 701 must be sufficiently large that, for any first geographic sub-area 701, any beam footprint 508 centered on another geographic sub-area 701 having a virtual TAC outside the TAL associated with the virtual TAC of the first geographic sub-area 701 has zero overlap with the first geographic sub-area 701. If the geographic sub-areas 701 are sized any smaller, a possibility arises that a stationary UE 110 in the first geographic sub-area 701 will, at some point, become covered by a beam footprint of a beam assigned to a virtual TAC outside the TAL, and in response will perform the Tracking Area Update.

On the other hand, sizing the geographic sub-areas 701 larger than necessary to meet this constraint decreases paging resolution, thereby increasing paging overhead cost. Accordingly, by selecting the size of the geographic sub-areas 701 to be equal to or only slightly larger than the size that satisfies the constraint, the satellite telecommunications system 100 can facilitate that the location update procedure will occur for a traveling UE 110 with a reasonable frequency so that paging overhead for the traveling UE 110 will not become too severe.

FIGS. 7 and 8 illustrate the constraint on the size of geographic sub-areas 701 discussed above. In particular, UE 110-1 and UE 110-2 connected to the RAN on a beam 506 broadcasting the physical localized identifier associated with the virtual localized identifier 22, and are located along different edges of the geographic sub-area 701. The virtual localized identifiers in the TAL received by the UE 110-1 and 110-2 (in response to connecting on the beam 506 broadcasting the physical localized identifier associated with the virtual localized identifier 22) are again illustrated by the pattern fill.

With respect to the UE 110-1, the beam footprint 508-H centered on the geographic sub-area 701 associated with the virtual localized identifier 14, at the edge of the TAL, can cover the UE 110-1. The same would be true for beam footprints (not shown) of the maximum extent 512 centered on the geographic sub-area 701 associated with the virtual localized identifiers 9 and 20 also in the TAL, for example. In contrast, it can be seen that beam footprints (not shown) of the maximum extent 512 centered on the geographic sub-area 701 associated with virtual localized identifiers 7, 13, or 19, which are closest to the UE 110-1 while being outside the TAL, can never reach the UE 110-1.

Similarly, with respect to the UE 110-2, the beam footprint 508-J centered on the geographic sub-area 701 associated with the virtual localized identifier 34, at the edge of the TAL, can cover the UE 110-2. The same would be true for beam footprints (not shown) of the maximum extent 512 centered on the geographic sub-area 701 associated with the virtual localized identifiers 22, 29, or 34 also in the TAL, for example. In contrast, it can be seen that beam footprints (not shown) of the maximum extent 512 centered on the geographic sub-area 701 associated with virtual localized identifiers 33, 35, and 40, which are closest to the UE 110-2 while being outside the TAL, can never reach the UE 110-1.

This analysis is not specific to the geographic sub-area 701 associated with the virtual localized identifier 22, but rather applies globally across the geographic sub-areas 701 and for any stationary UE location within those geographic sub-areas 701. In other words, the only geographic sub-areas 701 for which a beam footprint of the maximum extent 512 and centered thereon can reach a UE 110 in the geographic sub-area 701 associated with the virtual localized identifier 22 are the geographic sub-areas 701 associated with virtual localized identifiers in the TAL associated with the virtual localized identifier 22.

One can note that not all beam footprints 508 of the maximum extent 512 centered on a geographic sub-area 701 associated with a virtual localized identifier in the TAL can reach UE 110-1 or UE 110-2. However, this does not conflict with the constraint above. There is no requirement that the UE be located within the maximum extent of a beam footprint centered on every virtual localized identifier in the TAL, only a requirement that the stationary UE cannot be located within the maximum extent of a beam footprint centered on a virtual localized identifier that is not in the TAL.

After the size of the geographic sub-areas 701 is selected to meet the constraint and virtual localized identifiers are assigned to the geographic sub-areas 701, an appropriately arranged group of localized identifiers (for example, the TAL in a 4G LTE implementation) can be identified for each virtual localized identifier. The group of localized identifiers for each virtual localized identifier can be stored by one or more of the cellular core 141, the topology service 312, or another suitable location within the satellite telecommunications system 100.

A shape of the geographic sub-areas 701 need not correspond with a shape of the beam footprints 508. In the illustrated embodiment, the geographic sub-areas 701 each have a hexagonal shape. Although only a portion of the ground area 500 shown in FIG. 5 is illustrated in FIG. 7, the geographic sub-areas 701 can be elements of a continuous grid that covers an entire ground area 500 (for example, an entire continent or the entire surface of the Earth) in a tiled pattern. However, other shapes and grid patterns for the geographic sub-areas 701 are also contemplated.

The cellular core 141 can be configured to transmit the physical localized identifier assignments for the beams of each satellite 102 to the satellites in advance of the time slot in which they become active. Alternatively, the physical localized identifier assignments for the beams of each satellite 102 can be included in the topology schedule data transmitted to the satellites 102 on the regular basis. For example, the topology service 132 can include the physical localized identifier assignments with the beam planning instructions (which allocate a direction and power of the beams 506 of the phased array antenna 105 of each satellite 102 on the slot-by-slot basis to cover the various geographic sub-areas 701, as discussed above). The satellite computer system 103 of each satellite 102 can be programmed to derive, from the physical localized identifier assignments for each beam 506, the localized identifier for broadcasting in the RAN information on that beam 506 during each time slot.

In other words, the RAN parameter information broadcast on each beam 506, by the base station platform implemented on the satellite computer system 103, and received by the UE 110 in the corresponding beam footprint 508, will inform the UE 110 of the physical TAC to which it is connecting. When the UE 110 connects via that beam, the satellite computer system 103 can transmit connection data to the cellular core 141, identifying the physical TAC of the beam and a connection time. Based on the mapping of physical localized identifiers to virtual localized identifiers across time slots as generated by the topology service 132, the cellular core 141 can determine the virtual localized identifier, and by association the geographic sub-area 701, to which the beam 506 is assigned. The cellular core 141 can cause to be stored location data for the first UE indicative of the determined geographic sub-area 701. For example, the location data can be stored by one or both of the MME 148 or the HSS 206.

Moreover, in response to receiving the connection data, the cellular core 141, topology service 132, or other implementing system can determine which group of localized identifiers (for example, which TAL) is associated with the determined virtual localized identifier, and can transmit to the satellite the group of localized identifiers for relay by the satellite to the newly connected UE 110.

At a subsequent time slot, a different beam 506 (either from the same satellite or a different satellite) will be assigned to cover the virtual localized identifier of that geographic sub-area 701. The RAN parameter information broadcast on the different beam 506 will include the same the TAC as the RAN parameter information broadcast by the previous beam 506 to which the UE 110 initially connected. If the UE 110 is within the beam footprint 508 of that different beam, the UE 110 will determine that it is connected to the same TAC despite the change in the physical beams 506.

As noted, the topology service 132 can be configured to track the mapping of virtual localized identifiers to physical beams 506 on a per-slot basis, and to communicate that mapping to one or more other elements of the satellite telecommunications system 100, such as to the cellular core 141. For example, when the cellular core 141 receives incoming data addressed to the UE 110, the cellular core 141 can determine, for example from the stored location data, the most recent virtual localized identifier in which communication with the UE 110 occurred, and then determine from the mapping which physical beam 506, of which satellite 102, is assigned to that virtual localized identifier during the current time slot. The cellular core can then communicate with that satellite 102 to determine if the UE 110 is (or can be) connected on that beam 506. If the satellite 102 responds that the UE 110 is connected, the cellular core can route the incoming data to the UE 110 via that physical beam 506. If the UE 110 is not connected on the beam assigned to that virtual localized identifier, for example due to movement of the UE 110 or a change in alignment of the beam footprint relative to the previous beam, the cellular core 141 can select one or more other virtual localized identifiers (for example, located near the stored location) in which the UE 110 may be located at the current time. The cellular core can then use the mapping to page the beams 506 covering those one or more other virtual localized identifiers during the current time slot to locate the UE 110.

As illustrated in FIG. 6, due to the fact that beam footprints 508 can have different shapes and sizes as compared to the geographic sub-areas 701, typically a single beam footprint 508 will not completely and exclusively cover a single virtual localized identifier. The topology service 132 can be configured to assign the physical TACs of the beams 506 to virtual localized identifiers in a way that provides substantially one-to-one correspondence between physical TAC assignments and virtual localized identifiers within the ground area 500. Although the satellite telecommunications system 100 can still function effectively with two overlapping beams 506 assigned to the same physical TAC, this situation may not be preferred. For example, any paging activity to that TAC will impose the paging overhead costs discussed above on two beams 506 instead of just one.

In some embodiments, the topology service 132 can be configured to apply a rule that assigns the physical TAC of each beam 506 to the virtual localized identifier of the geographic sub-area 701 on which the beam footprint 508 is most closely centered, or has the greatest amount of overlap. The location of the boundaries of the beam footprints 508 can change with respect to the geographic sub-areas 701 as the satellite 102 moves over the ground area 500, even in a primarily "sliding" (steered) beam approach as discussed above, because the elongation of the beam footprint 508 can change as the incidence angle 510 changes. The amount of overlap of each beam footprint 508 with the geographic sub-areas 701 can be evaluated based on the beam plan for a particular time during the satellite's communication window with the ground area. For example, the time of evaluation can be associated with the first time slot during which the satellite 102 is in communication with UE 110 in the ground area.

For example, with particular reference to FIGS. 1B, 5, and 6, after generating the beam planning instructions for the satellite 102B for the time slot that includes time T1, the topology service 132 determines that beam footprint 508-D will cover portions of the geographic sub-areas 701 associated with virtual localized identifiers 15, 16, 21, 22, and 28, and beam footprint 508-E will cover portions of the geographic sub-areas 701 associated with virtual localized identifiers 21, 27, 28, and 34. The topology service 132 also determines that the virtual localized identifier of the geographic sub-area 701 with which the beam footprint 508-D has the greatest amount of overlap is 22, and the virtual localized identifier of the geographic sub-area 701 with which the beam footprint 508-E has the greatest amount of overlap is 28. Accordingly, the topology service 132 assigns 22 as the physical TAC of the beam that produces beam footprint 508-D, and assigns 28 as the physical TAC of the beam that produces beam footprint 508-E. Physical TACs for the beams corresponding to the other beam footprints 508 can be similarly assigned.

Other rules for assigning the physical TACs of the beams 506 to virtual localized identifiers are also contemplated. In addition, other times for evaluation of the rules are also contemplated. It should be understood that the planning of the physical TAC assignments need not be delayed until the time of evaluation arrives. Recall that in the exemplary embodiment, the beam plan instructions, including the physical TAC assignments, for upcoming time slots are generated in advance by the topology service 132 and transmitted to the satellites 102 before those time slots actually arrive.

In general, it is possible for the beam plan to include two or more beams 506 with footprints 508 that both have their greatest amount of overlap on the same geographic sub-area 701 during the time of evaluation for assignment of physical TACs. In embodiments in which the size of the typical beam footprint 508 is selected under the constraint discussed above, the topology service 132 can typically develop the beam plan to avoid situations in which the beam footprints 508 of two different beams have their greatest amount of overlap on the same the geographic sub-area 701 at the time of evaluation. Additionally or alternatively, the rules applied by the topology service 132 can include a conflict avoidance rule that detects if a primary rule has assigned the same physical TAC to two different beams, and changes the physical TAC assignment of one of the beams.

Due to the fact that beam footprints 508 can have different shapes and sizes as compared to the geographic sub-areas 701, and to avoid omitting any portion of the ground area from coverage by a beam 506, the beam plan can include beam footprints 508 that overlap to some degree. For example, in the example illustrated in FIG. 7, beam footprints 508-D and 508-E overlap within portions of the geographic sub-areas 701 associated with virtual localized identifiers 21 and 28. UE 110 in these overlap regions that receive a signal from two or more overlapping beams will detect the two or more beams as two or more overlapping terrestrial cells associated with the same provider, and can simply follow the standard RAN protocol for connecting to one of the multiple available cells (for example, by prioritizing signal strength).

In some embodiments, after the physical TACs of the beams 506 are assigned to the virtual localized identifiers of the geographic sub-areas 701 in the ground area 500, the physical TACs of the beams remain unchanged through one or more time slots until the satellite 102B is instructed to redirect or regenerate its beams 506 for the next ground area (that is, to focus on the next set of virtual localized identifiers that will come into the field of regard 504 as the satellite advances in orbit relative to the ground). In other words, the physical TACs of the beams 506 can be maintained throughout the pass of the satellite 102B over the ground area 500. This can provide an advantage in reducing computational overhead, as changing the physical TAC of one or more beams typically increases computational overhead at the base station platform implemented by the satellite computer system 103. For example, changing the physical TAC can require a reboot of one or more processes executed by the base station platform. However, embodiments in which the physical TAC of one or more of the beams 506 are changed during the pass of the satellite 102B over the ground area 500 are also contemplated.

In an example, at time T1, a substantially circular (due to the ninety-degree incidence angle 510) beam footprint 508-C of the nadir beam 506-C (shown in FIG. 5; not shown in FIG. 6 for purposes of clarity) can be located just below the geographic sub-areas 701 associated with virtual localized identifiers 39 and 40 in FIG. 6. Also in the example, the satellite 102B can be moving towards the top of the page relative to the ground area 500 in the view of FIG. 6. The beam footprints 508-D and 508-E are not far displaced from the beam footprint 508-C, and accordingly are only relatively slightly elongated while beam 506-C is the nadir beam. Two UE 110 (designated UE 110-1 and UE 110-2) are located at specific locations within the geographic sub-area 701 associated with virtual localized identifier 22, and during the time slot that includes time T1, they each access the satellite telecommunications system 100 via the beam 506 associated with the beam footprint 508-D.

Figure 9B:
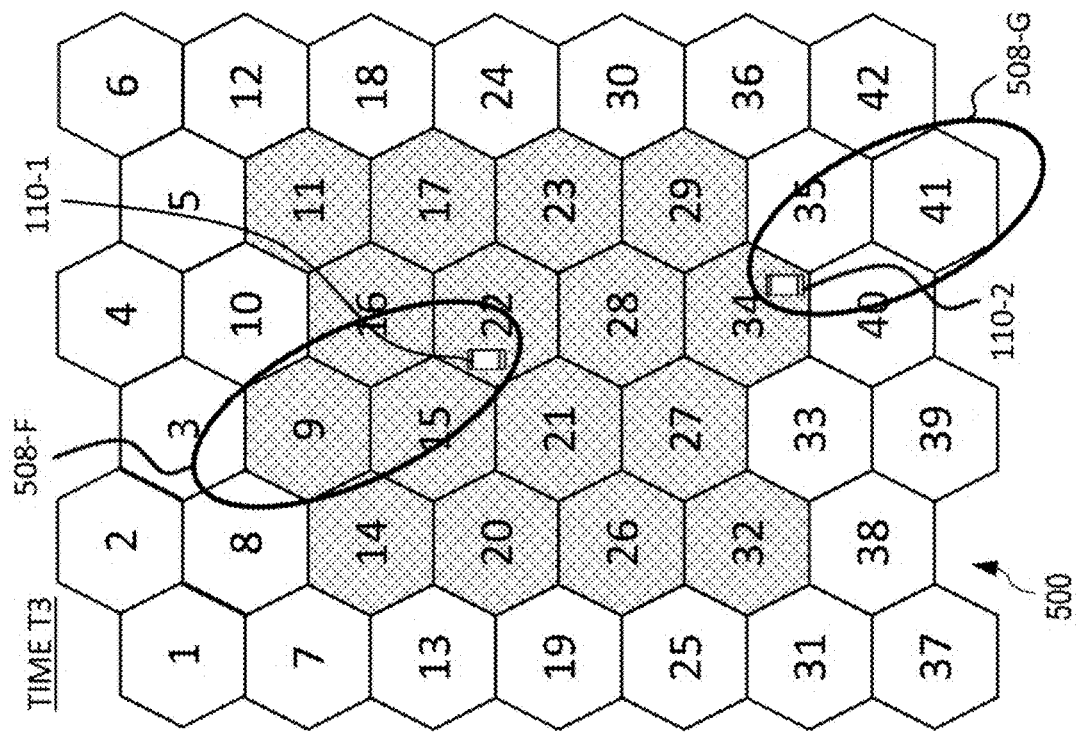
FIG. 9B illustrates an example placement, at a third time, of different beam footprints on the geographic sub-areas shown in FIG. 6.
Figure 9A:
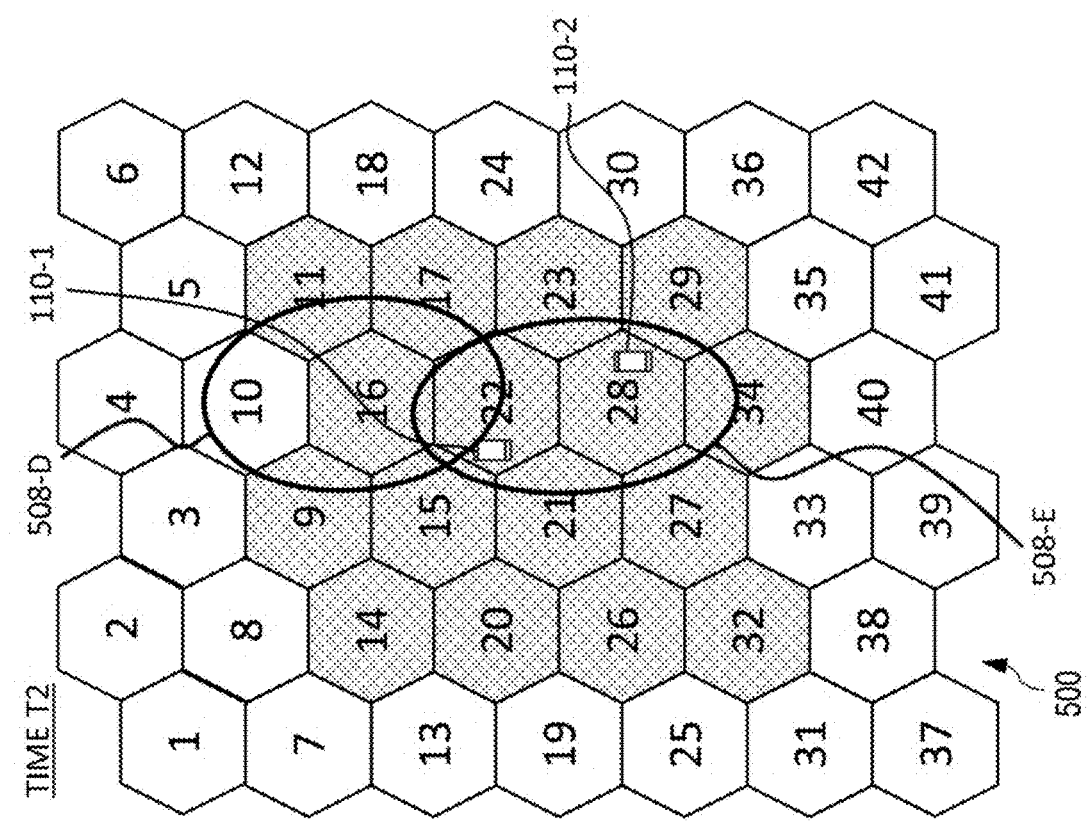
FIG. 9A illustrates an example placement, at a second time, of the beam footprints on the geographic sub-areas shown in FIG. 6.

FIG. 9A illustrates an example placement, at a second time T2, of the beam footprints 508 on the geographic sub-areas 701 shown in FIG. 6. The time T2 occurs after time T1. The UE 110-1 has remained stationary, while the UE 110-2 has moved out of the geographic sub-area 701 associated with virtual localized identifier 22 and into the geographic sub-area 701 associated with virtual localized identifier 28. As discussed above, the satellite computer system 103 of the satellite 102B can instruct the phased array antenna 105 to "slide" or steer the beams to keep each beam footprint on or near the geographic sub-area 701 associated with the virtual localized identifier to which the beam was assigned while the satellite 102B progresses in its orbit relative to the ground area 500. In some embodiments, the programmed slide may not be complete, but rather may still allow a center of one or more of the beam footprints 508 to shift or "glide" to some degree in the direction of the satellite's travel.

As discussed above, beam 506-C will quickly cease to be the nadir beam as the satellite 102B moves. Its incidence angle 510 will quickly decrease from ninety degrees as the satellite moves further past the geographic sub-area 701 to which beam 506-C is directed, and correspondingly its beam footprint will become progressively more elongated. The nearby beam footprints 508-D and 508-E will likewise become progressively more elongated, as shown in FIG. 9A for the later time T2. At time T2, despite the UE 110-1 remaining stationary in the geographic sub-area 701 associated with virtual localized identifier 22, the beam footprint 508-D (of the beam having the physical TAC 22) has glided towards the top of the page and no longer covers the UE 110-1. In addition, the traveling UE 110-2 has moved to the geographic sub-area 701 associated with virtual localized identifier 28. Both UE 110-1 and 110-2 are now within the beam footprint 508-E (having the physical TAC 28). Recall that the UE 110 will not perform a location update process so long as the beam 506 they connect to is broadcasting a physical localized identifier in the group of localized identifiers. Therefore, neither the stationary UE 110-1 nor the moving UE 110-2 will have to perform the location update procedure (in this example, the TAC update procedure under 4G LTE), because TAC 28 is in the TAL that was provided, by the base station platform implemented by the satellite computer system 103, to the UE 110-1 and 110-2 when they connected at time T1. Accordingly, both the UE 110-1 and UE 110-2 can continue communication with the RAN through the base station platform implemented by the satellite computer system 103 of satellite 102B, via the beam associated with beam footprint 508-E, and location update procedure overhead costs on the satellite telecommunications system 100 are avoided.

FIG. 9B illustrates an example placement, at a third time T3, of beam footprints 508 on the geographic sub-areas 701 shown in FIG. 6. The time T3 occurs after time T2. The UE 110-1 has again remained stationary, while the traveling UE 110-2 has now moved into the geographic sub-area 701 associated with virtual localized identifier 34. With reference to FIGS. 1B, 5, 6, 9A, and 9B, at time T3, the satellite 102B has moved out of communication range with the ground area 500, and a different satellite 102A has moved into position to direct beams 506 to the ground area 500, including (but not limited to) beams associated with the illustrated beam footprints 508-F and 508-G. The topology service 132 has assigned the physical TAC 9 to the beam associated with beam footprint 508-F (for example, based on applying the rule that, at the initiation of coverage of the ground area 500 by the satellite 102A, the beam footprint 508-F has the greatest amount of overlap with the geographic sub-area 701 associated with virtual localized identifier 9). In addition, the topology service 132 has assigned the physical TAC 41 to the beam associated with beam footprint 508-G (for example, based on applying the rule that, at the initiation of coverage of the ground area 500 by the satellite 102A, the beam footprint 508-G has the greatest amount of overlap with the geographic sub-area 701 associated with virtual localized identifier 41).

The stationary UE 110-1 is within the beam footprint 508-F. Therefore, the UE 110-1 can be handed over to communicate with the base station platform implemented by the satellite computer system 103 of the satellite 102A, via the beam associated with beam footprint 508-F. Moreover, the physical TAC 9 of the beam associated with beam footprint 508-F is in the TAL that was previously provided to the UE 110-1 upon its initial connection to the RAN at time T1, so the TAC update procedure is not triggered for UE 110-1, despite the fact that the beam associated with beam footprint 508-F is generated by a different satellite from the satellite that the UE 110-1 connected with initially.

The traveling UE 110-2 is within the beam footprint 508-G. Therefore, the UE 110-2 can be handed over to communicate with the base station platform implemented by the satellite computer system 103 of the satellite 102A, via the beam associated with beam footprint 508-G. However, the physical TAC of the beam associated with beam footprint 508-G, mapped from the virtual localized identifier 41, is not in the TAL that was previously provided to the UE 110-2 upon its initial connection to the RAN at time T1, so the location update procedure is triggered for UE 110-2. This is so despite the geographic location of the UE 110-2 within the geographic sub-area 701 associated with virtual localized identifier 34 (which was in the TAL), because of the non-matching shapes and offset positioning between the geographic sub-areas 701 and the beam footprints 508. In this case, the overhead cost of the location update procedure is worthwhile to avoid the paging overhead that would likely be required to locate the traveling UE 110-2, which was last reported to the cellular core 141 as being located in TAC 22 at time T1. (Recall that no location update procedure was triggered when the UE 110-2 moved to TAC 28 at time T2.)

In this example, a new TAL will be delivered to the UE 110-2 as part of TAC update procedure at time T3. In some embodiments, the new group of localized identifiers provided in response to a location update procedure is not automatically the group of localized identifiers stored in association with the virtual localized identifier mapped from the physical beam. More specifically, in some embodiments, the satellite telecommunications system 100 imposes an additional constraint that the new group of localized identifiers must overlap with the most recent group of localized identifiers previously provided to the UE 110-2. This additional constraint reduces a possibility that the UE 110-2 will oscillate between the previous TAL and a new non-overlapping TAL as beam footprints 508 shift on the ground. For example, the TAL stored for transmission to the UE upon a first connection to a beam broadcasting the physical TAC mapped to virtual localized identifier 41 could have an upper edge defined by the virtual localized identifiers 35, 40, and 42. The UE 110-2 could quickly become covered by a beam 506 broadcasting the physical localized identifier associated with the virtual localized identifier 34, triggering another location update procedure.

Under the constraint requiring overlap between the new TAL and the previous TAL, the virtual localized identifiers in the new TAL will still be evenly distributed around the virtual localized identifier 41 associated with the beam footprint 508-G, but the arrangement of the new TAL will be shifted to include, at minimum, the virtual localized identifier 34, which is the virtual localized identifier from the previous TAL that is closest to virtual localized identifier 41. Note that the cellular core 141 (or another element of the satellite telecommunications system 100, such as the topology service 132) can identify the previous TAL most recently provided to the UE 110-2 based on the location of the UE 110-2 that was stored at time T1, and can record the new TAL transmitted to the satellite 102A in response to the location update procedure at time T3 for use in applying the overlapping TAL constraint if another location update procedure is triggered at a subsequent time. The constraint that a new TAL provided in response to a location update procedure must overlap with the previous TAL ensures that any location update procedure will always move the center of the new TAL closer to the physical location of the UE.

Accordingly, the dynamic mapping of virtual localized identifiers to physical localized identifiers (for example, TACs) as each successive satellite 102 moves into communication with the ground area 500, as disclosed herein, advantageously reduces occurrences of the location update procedure, while ensuring that the location update procedure for the UE 110 that are traveling through multiple geographic sub-areas 701 occurs sufficiently frequently to avoid the paging overhead associated with paging a large number of cells to locate the UE. As discussed, the location update procedure can be substantially eliminated for stationary UE 110 by sizing the geographic sub-areas 701 to satisfy the constraint that, for any first geographic sub-area 701, the maximum extent of any beam footprint 508 centered on another geographic sub-area 701 having a virtual localized identifier outside the group of localized identifiers (for example, the TAL) associated with the virtual localized identifier of the first geographic sub-area 701 has zero overlap with the first geographic sub-area 701.

Figure 10:
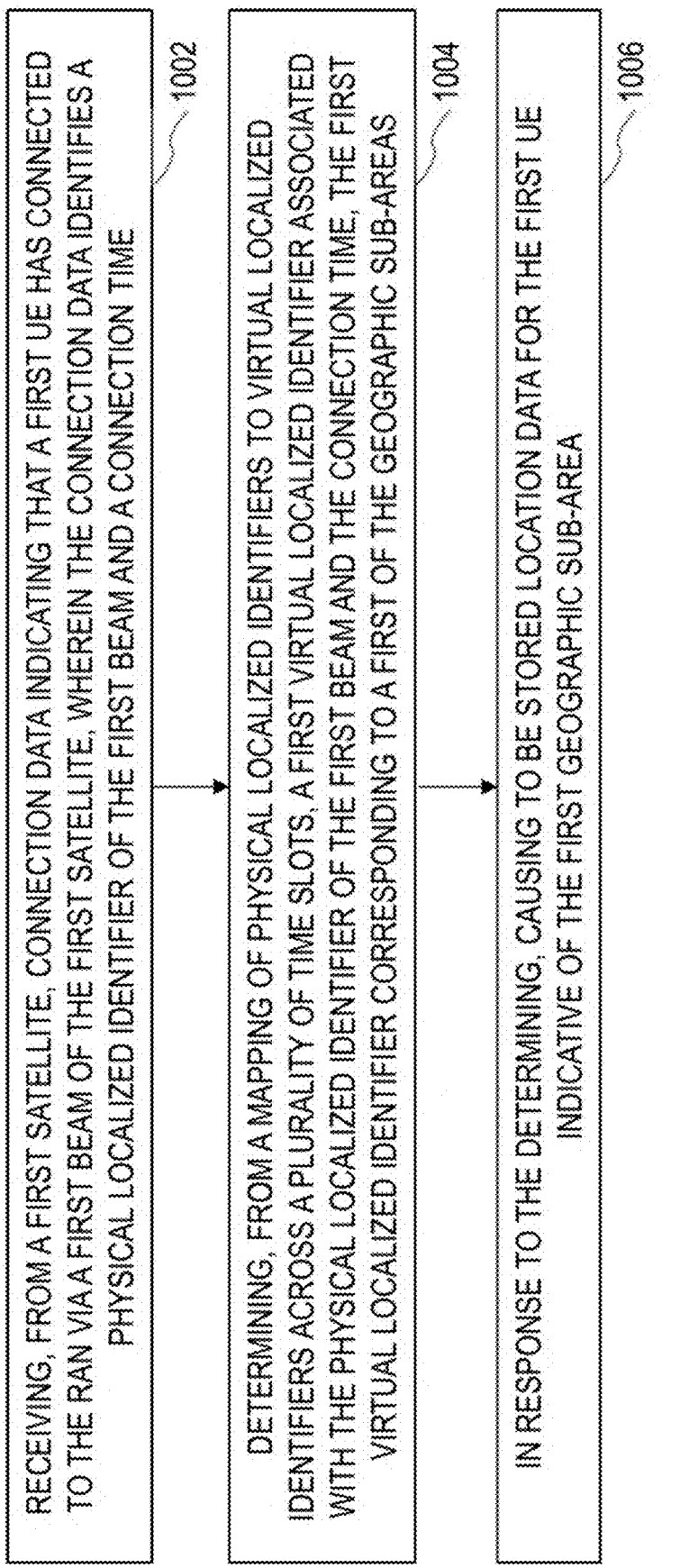
FIG. 10 illustrates an example method in accordance with embodiments of the present disclosure.

FIG. 10 illustrates an example method 1000 for mapping geographic sub-areas of a ground area to cells of a radio access network (RAN) implemented by a plurality of satellites. Each of the satellites includes at least one antenna configured to send and receive signals to terrestrial user equipment (UE) via a plurality of directional beams, and each of the beams has a beam footprint that defines a cell of the RAN. The method is implemented by a computer system, such as at the cellular core 141, the topology service 132, another element of the satellite telecommunications system 100, or some combination thereof. The computer system includes at least one processor configured to perform steps that can include one or more of: receiving, from a first satellite of the plurality of satellites, connection data indicating that a first UE has connected to the RAN via a first beam of the first satellite, wherein the connection data identifies a physical localized identifier of the first beam and a connection time (1002); determining, from a mapping of physical localized identifiers to virtual localized identifiers across a plurality of time slots, a first virtual localized identifier associated with the physical localized identifier of the first beam and the connection time, the first virtual localized identifier corresponding to a first of the geographic sub-areas (1004); and, in response to the determining, causing to be stored location data for the first UE indicative of the first geographic sub-area (1006).

A system embodiment can include a computer system for mapping geographic sub-areas of a ground area to cells of a radio access network (RAN) implemented by a plurality of satellites. Each of the satellites includes at least one antenna configured to send and receive signals to terrestrial user equipment (UE) via a plurality of directional beams, and each of the beams has a beam footprint that defines a cell of the RAN The computer system includes at least one processor coupled to a memory, and the memory includes instructions that are executable to cause the at least one processor to perform steps that can include one or more of: receiving, from a first satellite of the plurality of satellites, connection data indicating that a first UE has connected to the RAN via a first beam of the first satellite, wherein the connection data identifies a physical localized identifier of the first beam and a connection time; determining, from a mapping of physical localized identifiers to virtual localized identifiers across a plurality of time slots, a first virtual localized identifier associated with the physical localized identifier of the first beam and the connection time, the first virtual localized identifier corresponding to a first of the geographic sub-areas; and, in response to the determining, causing to be stored location data for the first UE indicative of the first geographic sub-area.

In some embodiments, the steps can further include transmitting, to the first satellite, physical localized identifier assignments for the plurality of beams of the first satellite for one or more time slots, wherein the physical localized identifier assignments instruct the first satellite to use the physical localized identifier for the first beam during the connection time. In some such embodiments, the step of transmitting the physical localized identifier assignments is performed in advance of an arrival of the one or more time slots.

In certain embodiments, the RAN is implemented as a 4G LTE RAN. In some embodiments, the physical localized identifiers are formatted as Tracking Area Codes.

In certain embodiments, the virtual localized identifiers are in a same data format as the physical localized identifiers. Alternatively, the virtual localized identifiers are in a data format different from a data format of the physical localized identifiers, and the mapping includes a transformation from the data format of the virtual localized identifiers into the data format of the physical localized identifiers.

In some embodiments, the steps further include: receiving, from a cellular core of the RAN at a current time subsequent to the connection time, incoming data addressed to the first UE; determining, from the mapping, that a second beam of a second of the plurality of satellites is associated with the first virtual localized identifier at the current time; and communicating with the second satellite to determine a connection status of the first UE on the second beam. In some such embodiments, the steps further include: transmitting, to the second satellite in advance of the current time, second beam plan instructions including second beam directions and second physical localized identifier assignments for the plurality of beams of the second satellite for a second one or more time slots including the current time, wherein the second beam directions cause the beam footprint of the second beam to overlap the first geographic sub-area during the current time, and wherein the second physical localized identifier assignments specify a physical localized identifier of the second beam during the current time that is mapped, in the mapping, to the first virtual localized identifier during the current time.

In certain embodiments, the steps further include: receiving an indication from the second satellite that the first UE is connected on the second beam; and routing the incoming data to the second beam.

In some embodiments, the steps further include: receiving an indication from the second satellite that the first UE is not connected on the second beam; selecting one or more of the virtual localized identifiers for paging the first UE; determining, from the mapping, one or more beams of the plurality of beams of one or more of the plurality of satellites that are associated with the one or more virtual localized identifiers at the current time; and paging the first UE on the one or more beams.

In certain embodiments, the UE are configured to receive a group of localized identifiers and to trigger a location update process through the RAN in response to connecting to any beam with a physical localized identifier not included in the group of localized identifiers, and the steps further include at least one of: in response to receiving the connection data, transmitting, to the first satellite, the group of localized identifiers for relay to the first UE; or transmitting, to the first satellite prior to the connection time, group of localized identifier assignments for the plurality of beams of the first satellite for one or more time slots, wherein the satellite is configured to identify the group of localized identifiers corresponding to the first beam from the group of localized identifier assignments and relay the identified group of localized identifiers to the first UE. In some such embodiments, the group of localized identifiers is a Tracking Area List.

In some embodiments, the steps further include: receiving, from the first satellite, location update request data from a second UE, wherein the location update request data identifies a physical localized identifier of a second beam of the plurality of beams of the first satellite; determining an updated group of localized identifiers corresponding to the second beam; and transmitting, to the first satellite, the updated group of localized identifiers for relay to the second UE. In certain embodiments, the step of determining the updated group of localized identifiers includes retrieving a previous group of localized identifiers most recently provided to the second UE, and including, in the updated group of localized identifiers, at least one localized identifier from the previous group of localized identifiers.

In certain embodiments, the steps further include storing predefined groups of localized identifiers, each of the predefined groups associated with one of the virtual localized identifiers, and selecting the group of localized identifiers as the predefined group associated with the first virtual localized identifier. In some such embodiments, each of the predefined groups of localized identifiers correspond to a number of geographic sub-areas that are distributed evenly around the geographic sub-area corresponding to associated one of the virtual localized identifiers. In some such embodiments, the beam footprint has a maximum extent, and the geographic sub-areas are sized such that, for any one of the geographic sub-areas, the maximum extent of the beam footprint centered on an other geographic sub-area has zero overlap with the one of the geographic sub-areas, the other geographic sub-area being any of the geographic sub-areas having a virtual localized identifier outside the predefined group of localized identifiers associated with the virtual localized identifier of the one of the geographic sub-areas.

FIG. 11 illustrates an example method 1100 implemented by a satellite computer system on a satellite. The satellite includes at least one antenna configured to send and receive signals to terrestrial user equipment (UE) on a radio access network (RAN). The satellite computer system includes at least one processor configured to perform steps of the method. The steps can include one or more of: receiving physical localized identifier assignments for a plurality of beams to be generated by the at least one antenna over a plurality of time slots, wherein each of the beams has a beam footprint that defines a cell of the RAN (1102); in response to arrival of a first time slot, controlling the at least one antenna to direct a first set of the plurality of beams to a first ground area and to broadcast first RAN parameter information on the first set of beams, wherein the first RAN parameter information includes first physical localized identifiers associated with the first time slot in the physical localized identifier assignments, wherein the first ground area includes a first plurality of geographic sub-areas, and wherein the physical localized identifier assignments for the first set of beams correspond to first virtual localized identifiers associated with the first plurality of geographic sub-areas (1104); and in response to arrival of a second time slot subsequent to the first time slot, controlling the at least one antenna to direct a second set of the plurality of beams to a second ground area and to broadcast second RAN parameter information on the second set of beams, wherein the second RAN parameter information includes second physical localized identifiers associated with the second time slot in the physical localized identifier assignments, wherein the second ground area includes a second plurality of geographic sub-areas different from the first plurality of geographic sub-areas, and wherein the second physical localized identifiers for the second set of beams correspond to second virtual localized identifiers associated with the second plurality of geographic sub-areas (1106).

A system embodiment can include a satellite computer system for a satellite, the satellite including at least one antenna configured to send and receive signals to terrestrial user equipment (UE) on a radio access network (RAN). The satellite computer system includes at least one processor in communication with a memory, the memory storing computer-readable instructions that are executable to cause the at least one processor to perform steps that can include one or more of: receiving physical localized identifier assignments for a plurality of beams to be generated by the at least one antenna over a plurality of time slots, wherein each of the beams has a beam footprint that defines a cell of the RAN; in response to arrival of a first time slot, controlling the at least one antenna to direct a first set of the plurality of beams to a first ground area and to broadcast first RAN parameter information on the first set of beams, wherein the first RAN parameter information includes first physical localized identifiers associated with the first time slot in the physical localized identifier assignments, wherein the first ground area includes a first plurality of geographic sub-areas, and wherein the physical localized identifier assignments for the first set of beams correspond to first virtual localized identifiers associated with the first plurality of geographic sub-areas; and in response to arrival of a second time slot subsequent to the first time slot, controlling the at least one antenna to direct a second set of the plurality of beams to a second ground area and to broadcast second RAN parameter information on the second set of beams, wherein the second RAN parameter information includes second physical localized identifiers associated with the second time slot in the physical localized identifier assignments, wherein the second ground area includes a second plurality of geographic sub-areas different from the first plurality of geographic sub-areas, and wherein the second physical localized identifiers for the second set of beams correspond to second virtual localized identifiers associated with the second plurality of geographic sub-areas.

In some embodiments, the steps further include implementing a base station platform of the RAN. In some such embodiments, the RAN is implemented as a 4G LTE RAN and the base station platform is implemented as an eNodeB.

In certain embodiments, the first and second physical localized identifiers are formatted as Tracking Area Codes. In some such embodiments, each of the first physical localized identifiers is broadcast as the Tracking Area Code of a beam of the first set of beams, and each of the second physical localized identifiers is broadcast as the Tracking Area Code of a beam of the second set of beams.

In some embodiments, the steps further include: accepting, during the first time slot, a connection request from a first UE via a first beam of the first set of beams; transmitting connection data to a ground-based computer system, wherein the connection data identifies a physical localized identifier of the first beam; receiving, from the ground-based computer system, a first group of localized identifiers that includes a first subset of the first virtual localized identifiers; and transmitting, to the first UE via the first beam, the first group of localized identifiers.

In certain embodiments, the steps further include accepting, during the second time slot, a connection request from a second UE via a first beam of the second set of beams; transmitting second connection data to the ground-based computer system, wherein the second connection data identifies a physical localized identifier of the first beam of the second set of beams; receiving, from the ground-based computer system, a second group of localized identifiers that includes a first subset of the second virtual localized identifiers; and transmitting, to the second UE via the first beam of the second set of beams, the second group of localized identifiers.

In some embodiments, the step of transmitting the first group of localized identifiers includes transmitting a first Tracking Area List.

Figure 12:
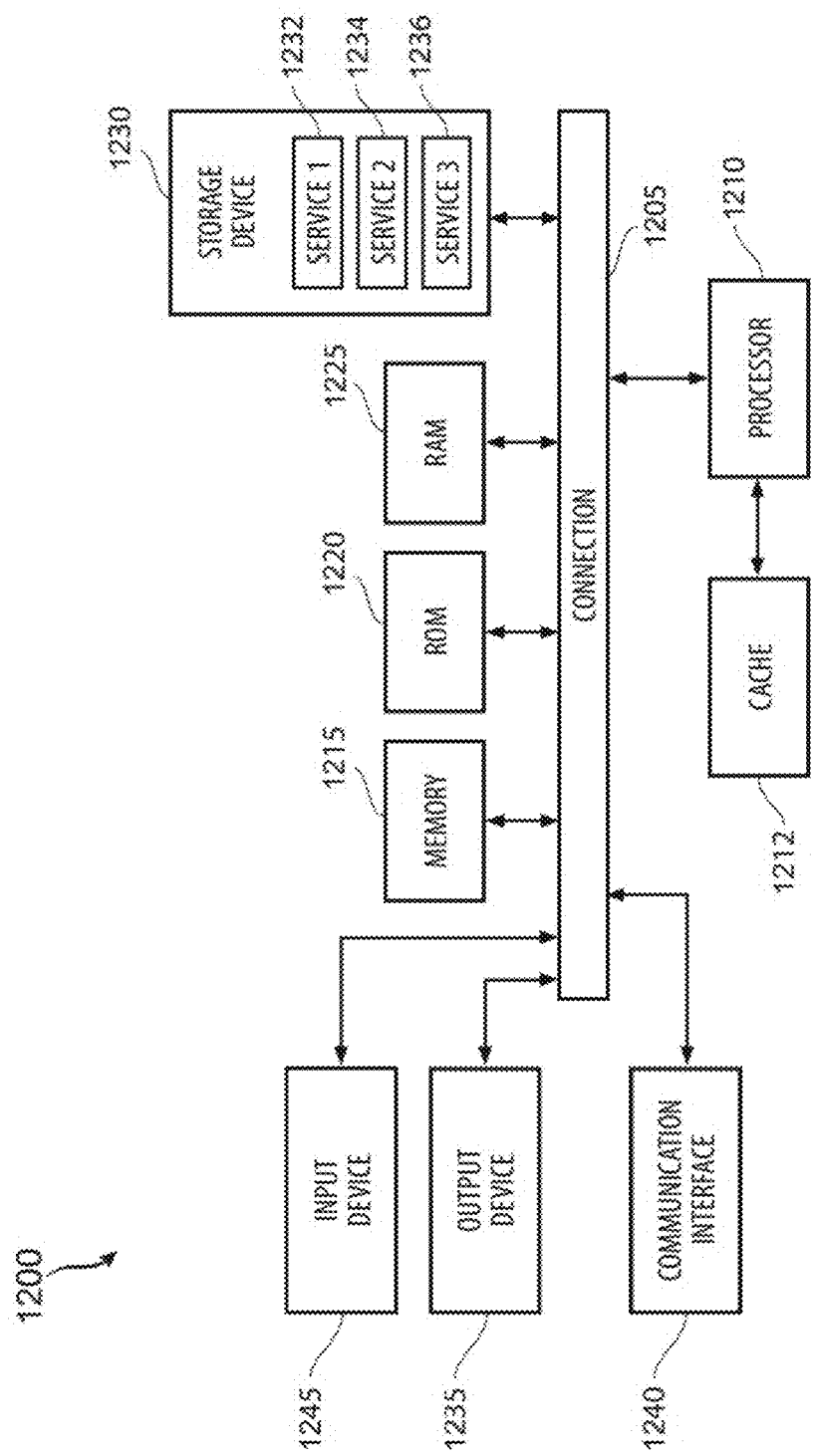
FIG. 12 illustrates a computer system that can be implemented with other aspects of the present disclosure.

FIG. 12 illustrates an example computer device that can be used in connection with any of the systems or components of the satellite computer system 103, the gateway terminal 104, the PoP 140, the cellular core 141, the topology service 132, the terrestrial telecommunications provider 200, the UE 110, the user terminal 112, the ground-based server 150, or other components disclosed herein. In this example, FIG. 12 illustrates a computing system 1200 including components in electrical communication with each other using a connection 1205, such as a bus. System 1200 includes a processing unit (CPU or processor) 1210 and a system connection 1205 that couples various system components including the system memory 1215, such as read only memory (ROM) 1220 and random access memory (RAM) 1225, to the processor 1210. The system 1200 can include a cache of high-speed memory connected directly with, in close proximity to, or integrated as part of the processor 1210. The system 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other system memory 1215 may be available for use as well. The memory 1215 can include multiple different types of memory with different performance characteristics. The processor 1210 can include any general purpose processor and a hardware or software service, such as service 1-1232, service 2-1234, and service 3-1236 stored in storage device 1230, configured to control the processor 1210 as well as a special-purpose processor where software instructions are incorporated into the actual processor design. The processor 1210 may be a completely self-contained computing system, containing multiple cores or processors, a bus, memory controller, cache, etc. A multi-core processor may be symmetric or asymmetric.

To enable user interaction with the system 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art. In some instances, multimodal systems can enable a user to provide multiple types of input to communicate with the system 1200. The communications interface 1240 can generally govern and manage the user input and system output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof.

The storage device 1230 can include services 1232, 1234, 1236 for controlling the processor 1210. Other hardware or software modules are contemplated. The storage device 1230 can be connected to the system connection 1205. In one aspect, a hardware module that performs a particular function can include the software component stored in a computer-readable medium in connection with the necessary hardware components, such as the processor 1210, connection 1205, output device 1235, and so forth, to carry out the function.

In some embodiments, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A computer system for mapping geographic sub-areas of a ground area to cells of a radio access network (RAN) implemented by a plurality of satellites, each of the satellites including at least one antenna configured to send and receive signals to terrestrial user equipment (UE) via a plurality of directional beams, each of the beams having a beam footprint that defines a cell of the RAN, the computer system comprising at least one processor coupled to a memory, the memory including instructions that are executable to cause the at least one processor to perform steps including:

receiving, from a first satellite of the plurality of satellites, connection data indicating that a first UE has connected to the RAN via a first beam of the first satellite, wherein the connection data identifies a physical localized identifier of the first beam and a connection time;

determining, from a mapping of physical localized identifiers to virtual localized identifiers across a plurality of time slots, a first virtual localized identifier associated with the physical localized identifier of the first beam and the connection time, the first virtual localized identifier corresponding to a first of the geographic sub-areas; and in response to the determining, causing to be stored location data for the first UE indicative of the first geographic sub-area.

2. The computer system according to claim 1, wherein the steps further include:

transmitting, to the first satellite, physical localized identifier assignments for the plurality of beams of the first satellite for one or more time slots, wherein the physical localized identifier assignments instruct the first satellite to use the physical localized identifier for the first beam during the connection time.

3. The computer system according to claim 2, wherein the step of transmitting the physical localized identifier assignments is performed in advance of an arrival of the one or more time slots.

4. The computer system according to claim 1, wherein the RAN is implemented as a 4G LTE RAN.

5. The computer system according to claim 1, wherein the physical localized identifiers are formatted as Tracking Area Codes.

6. The computer system according to claim 1, wherein the virtual localized identifiers are in a same data format as the physical localized identifiers.

7. The computer system according to claim 1, wherein the virtual localized identifiers are in a data format different from a data format of the physical localized identifiers, and wherein the mapping includes a transformation from the data format of the virtual localized identifiers into the data format of the physical localized identifiers.

8. The computer system according to claim 1, wherein the steps further include:

receiving, from a cellular core of the RAN at a current time subsequent to the connection time, incoming data addressed to the first UE;

determining, from the mapping, that a second beam of a second of the plurality of satellites is associated with the first virtual localized identifier at the current time; and communicating with the second satellite to determine a connection status of the first UE on the second beam.

9. The computer system according to claim 8, wherein the steps further include:

transmitting, to the second satellite in advance of the current time, second beam plan instructions including second beam directions and second physical localized identifier assignments for the plurality of beams of the second satellite for a second one or more time slots including the current time, wherein the second beam directions cause the beam footprint of the second beam to overlap the first geographic sub-area during the current time, and wherein the second physical localized identifier assignments specify a physical localized identifier of the second beam during the current time that is mapped, in the mapping, to the first virtual localized identifier during the current time.

10. The computer system according to claim 8, wherein the steps further include:

receiving an indication from the second satellite that the first UE is connected on the second beam; and routing the incoming data to the second beam.

11. The computer system according to claim 8, wherein the steps further include:

receiving an indication from the second satellite that the first UE is not connected on the second beam;

selecting one or more of the virtual localized identifiers for paging the first UE;

determining, from the mapping, one or more beams of the plurality of beams of one or more of the plurality of satellites that are associated with the one or more virtual localized identifiers at the current time; and paging the first UE on the one or more beams.

12. The computer system according to claim 1, wherein the UE are configured to receive a group of localized identifiers and to trigger a location update process through the RAN in response to connecting to any beam with a physical localized identifier not included in the group of localized identifiers, and wherein the steps further include at least one of:

in response to receiving the connection data, transmitting, to the first satellite, the group of localized identifiers for relay to the first UE; or transmitting, to the first satellite prior to the connection time, group of localized identifier assignments for the plurality of beams of the first satellite for one or more time slots, wherein the satellite is configured to identify the group of localized identifiers corresponding to the first beam from the group of localized identifier assignments and relay the identified group of localized identifiers to the first UE.

13. The computer system according to claim 12, wherein the group of localized identifiers is a Tracking Area List.

14. The computer system according to claim 12, wherein the steps further include:

receiving, from the first satellite, location update request data from a second UE, wherein the location update request data identifies a physical localized identifier of a second beam of the plurality of beams of the first satellite;

determining an updated group of localized identifiers corresponding to the second beam; and transmitting, to the first satellite, the updated group of localized identifiers for relay to the second UE.

15. The computer system according to claim 14, wherein the step of determining the updated group of localized identifiers includes:

retrieving a previous group of localized identifiers most recently provided to the second UE; and including, in the updated group of localized identifiers, at least one localized identifier from the previous group of localized identifiers.

16. The computer system according to claim 12, wherein the steps further include:

storing predefined groups of localized identifiers, each of the predefined groups associated with one of the virtual localized identifiers; and selecting the group of localized identifiers as the predefined group associated with the first virtual localized identifier.

17. The computer system according to claim 16, wherein each of the predefined groups of localized identifiers correspond to a number of geographic sub-areas that are distributed evenly around the geographic sub-area corresponding to associated one of the virtual localized identifiers.

18. The computer system according to claim 17, wherein the beam footprint has a maximum extent, and wherein the geographic sub-areas are sized such that, for any one of the geographic sub-areas, the maximum extent of the beam footprint centered on an other geographic sub-areas has zero overlap with the one of the geographic sub-areas, the other geographic sub-area being any of the geographic sub-areas having a virtual localized identifier outside the predefined group of localized identifiers associated with the virtual localized identifier of the one of the geographic sub-areas.

19. A method for mapping geographic sub-areas of a ground area to cells of a radio access network (RAN) implemented by a plurality of satellites, each of the satellites including at least one antenna configured to send and receive signals to terrestrial user equipment (UE) via a plurality of directional beams, each of the beams having a beam footprint that defines a cell of the RAN, the method implemented by a computer system including at least one processor configured to perform steps including:

receiving, from a first satellite of the plurality of satellites, connection data indicating that a first UE has connected to the RAN via a first beam of the first satellite, wherein the connection data identifies a physical localized identifier of the first beam and a connection time;

determining, from a mapping of physical localized identifiers to virtual localized identifiers across a plurality of time slots, a first virtual localized identifier associated with the physical localized identifier of the first beam and the connection time, the first virtual localized identifier corresponding to a first of the geographic sub-areas; and in response to the determining, causing to be stored location data for the first UE indicative of the first geographic sub-area.

20. The method according to claim 19, wherein the steps further include:

transmitting, to the first satellite, physical localized identifier assignments for the plurality of beams of the first satellite for one or more time slots, wherein the physical localized identifier assignments instruct the first satellite to use the physical localized identifier for the first beam during the connection time.

21. The method according to claim 20, wherein the step of transmitting the physical localized identifier assignments is performed in advance of an arrival of the one or more time slots.

22. The method according to claim 19, wherein the RAN is implemented as a 4G LTE RAN.

23. The method according to claim 19, wherein the physical localized identifiers are formatted as Tracking Area Codes.

24. The method according to claim 19, wherein the virtual localized identifiers are in a same data format as the physical localized identifiers.

25. The method according to claim 19, wherein the virtual localized identifiers are in a data format different from a data format of the physical localized identifiers, and wherein the mapping includes a transformation from the data format of the virtual localized identifiers into the data format of the physical localized identifiers.

26. The method according to claim 19, wherein the steps further include:

receiving, from a cellular core of the RAN at a current time subsequent to the connection time, incoming data addressed to the first UE;

determining, from the mapping, that a second beam of a second of the plurality of satellites is associated with the first virtual localized identifier at the current time; and communicating with the second satellite to determine a connection status of the first UE on the second beam.

27. The method according to claim 26, wherein the steps further include:

transmitting, to the second satellite in advance of the current time, second beam plan instructions including second beam directions and second physical localized identifier assignments for the plurality of beams of the second satellite for a second one or more time slots including the current time, wherein the second beam directions cause the beam footprint of the second beam to overlap the first geographic sub-area during the current time, and wherein the second physical localized identifier assignments specify a physical localized identifier of the second beam during the current time that is mapped, in the mapping, to the first virtual localized identifier during the current time.

28. The method according to claim 26, wherein the steps further include:
   receiving an indication from the second satellite that the first UE is connected on the second beam; and
   routing the incoming data to the second beam.

29. The method according to claim 26, wherein the steps further include:
   receiving an indication from the second satellite that the first UE is not connected on the second beam;
   selecting one or more of the virtual localized identifiers for paging the first UE;
   determining, from the mapping, one or more beams of the plurality of beams of one or more of the plurality of satellites that are associated with the one or more virtual localized identifiers at the current time; and
   paging the first UE on the one or more beams.

30. The method according to claim 19, wherein the UE are configured to receive a group of localized identifiers and to trigger a location update process through the RAN in response to connecting to any beam with a physical localized identifier not included in the group of localized identifiers, and wherein the steps further include at least one of:
   in response to receiving the connection data, transmitting, to the first satellite, the group of localized identifiers for relay to the first UE; or
   transmitting, to the first satellite prior to the connection time, group of localized identifier assignments for the plurality of beams of the first satellite for one or more time slots, wherein the satellite is configured to identify the group of localized identifiers corresponding to the first beam from the group of localized identifier assignments and relay the identified group of localized identifiers to the first UE.

31. The method according to claim 30, wherein the group of localized identifiers is a Tracking Area List.

32. The method according to claim 30, wherein the steps further include:
   receiving, from the first satellite, location update request data from a second UE, wherein the location update request data identifies a physical localized identifier of a second beam of the plurality of beams of the first satellite;
   determining an updated group of localized identifiers corresponding to the second beam; and
   transmitting, to the first satellite, the updated group of localized identifiers for relay to the second UE.

33. The method according to claim 32, wherein the step of determining the updated group of localized identifiers includes:
   retrieving a previous group of localized identifiers most recently provided to the second UE; and
   including, in the updated group of localized identifiers, at least one localized identifier from the previous group of localized identifiers.

34. The method according to claim 30, wherein the steps further include:
   storing predefined groups of localized identifiers, each of the predefined groups associated with one of the virtual localized identifiers; and
   selecting the group of localized identifiers as the predefined group associated with the first virtual localized identifier.

35. The method according to claim 34, wherein each of the predefined groups of localized identifiers correspond to a number of geographic sub-areas that are distributed evenly around the geographic sub-area corresponding to associated one of the virtual localized identifiers.

36. The method according to claim 35, wherein the beam footprint has a maximum extent, and wherein the geographic sub-areas are sized such that, for any one of the geographic sub-areas, the maximum extent of the beam footprint centered on an other geographic sub-area has zero overlap with the one of the geographic sub-areas, the other geographic sub-area being any of the geographic sub-areas having a virtual localized identifier outside the predefined group of localized identifiers associated with the virtual localized identifier of the one of the geographic sub-areas.

37. A satellite computer system for a satellite, the satellite including at least one antenna configured to send and receive signals to terrestrial user equipment (UE) on a radio access network (RAN), the satellite computer system comprising at least one processor in communication with a memory, the memory storing computer-readable instructions that are executable to cause the at least one processor to perform steps including:
   receiving physical localized identifier assignments for a plurality of beams to be generated by the at least one antenna over a plurality of time slots, wherein each of the beams has a beam footprint that defines a cell of the RAN;
   in response to arrival of a first time slot, controlling the at least one antenna to direct a first set of the plurality of beams to a first ground area and to broadcast first RAN parameter information on the first set of beams, wherein the first RAN parameter information includes first physical localized identifiers associated with the first time slot in the physical localized identifier assignments, wherein the first ground area includes a first plurality of geographic sub-areas, and wherein the physical localized identifier assignments for the first set of beams correspond to first virtual localized identifiers associated with the first plurality of geographic sub-areas; and
   in response to arrival of a second time slot subsequent to the first time slot, controlling the at least one antenna to direct a second set of the plurality of beams to a second ground area and to broadcast second RAN parameter information on the second set of beams, wherein the second RAN parameter information includes second physical localized identifiers associated with the second time slot in the physical localized identifier assignments, wherein the second ground area includes a second plurality of geographic sub-areas different from the first plurality of geographic sub-areas, and wherein the second physical localized identifiers for the second set of beams correspond to second virtual localized identifiers associated with the second plurality of geographic sub-areas.

38. The satellite computer system according to claim 37, wherein the steps further include implementing a base station platform of the RAN.

39. The satellite computer system according to claim 38, wherein the RAN is implemented as a 4G LTE RAN and the base station platform is implemented as an eNodeB.

40. The satellite computer system according to claim 37, wherein the first and second physical localized identifiers are formatted as Tracking Area Codes.

41. The satellite computer system according to claim 40, wherein each of the first physical localized identifiers is broadcast as the Tracking Area Code of a beam of the first set of beams, and each of the second physical localized identifiers is broadcast as the Tracking Area Code of a beam of the second set of beams.

42. The satellite computer system according to claim 37, wherein the steps further include:
accepting, during the first time slot, a connection request from a first UE via a first beam of the first set of beams;
transmitting connection data to a ground-based computer system, wherein the connection data identifies a physical localized identifier of the first beam;
receiving, from the ground-based computer system, a first group of localized identifiers that includes a first subset of the first virtual localized identifiers; and
transmitting, to the first UE via the first beam, the first group of localized identifiers.

43. The satellite computer system according to claim 42, wherein the steps further include:
accepting, during the second time slot, a connection request from a second UE via a first beam of the second set of beams;
transmitting second connection data to the ground-based computer system, wherein the second connection data identifies a physical localized identifier of the first beam of the second set of beams;
receiving, from the ground-based computer system, a second group of localized identifiers that includes a first subset of the second virtual localized identifiers; and
transmitting, to the second UE via the first beam of the second set of beams, the second group of localized identifiers.

44. The satellite computer system according to claim 42, wherein the step of transmitting the first group of localized identifiers comprises transmitting a first Tracking Area List.

45. A method implemented by a satellite computer system of a satellite, the satellite including at least one antenna configured to send and receive signals to terrestrial user equipment (UE) on a radio access network (RAN), the satellite computer system including at least one processor configured to perform steps of the method including:
receiving physical localized identifier assignments for a plurality of beams to be generated by the at least one antenna over a plurality of time slots, wherein each of the beams has a beam footprint that defines a cell of the RAN;
in response to arrival of a first time slot, controlling the at least one antenna to direct a first set of the plurality of beams to a first ground area and to broadcast first RAN parameter information on the first set of beams, wherein the first RAN parameter information includes first physical localized identifiers associated with the first time slot in the physical localized identifier assignments, wherein the first ground area includes a first plurality of geographic sub-areas, and wherein the physical localized identifier assignments for the first set of beams correspond to first virtual localized identifiers associated with the first plurality of geographic sub-areas; and
in response to arrival of a second time slot subsequent to the first time slot, controlling the at least one antenna to direct a second set of the plurality of beams to a second ground area and to broadcast second RAN parameter information on the second set of beams, wherein the second RAN parameter information includes second physical localized identifiers associated with the second time slot in the physical localized identifier assignments, wherein the second ground area includes a second plurality of geographic sub-areas different from the first plurality of geographic sub-areas, and wherein the second physical localized identifiers for the second set of beams correspond to second virtual localized identifiers associated with the second plurality of geographic sub-areas.

46. The method according to claim 45, wherein the steps further include implementing a base station platform of the RAN.

47. The method according to claim 46, wherein the RAN is implemented as a 4G LTE RAN and the base station platform is implemented as an eNodeB.

48. The method according to claim 45, wherein the first and second physical localized identifiers are formatted as Tracking Area Codes.

49. The method according to claim 48, wherein each of the first physical localized identifiers is broadcast as the Tracking Area Code of a beam of the first set of beams, and each of the second physical localized identifiers is broadcast as the Tracking Area Code of a beam of the second set of beams.

50. The method according to claim 45, wherein the steps further include:
accepting, during the first time slot, a connection request from a first UE via a first beam of the first set of beams;
transmitting connection data to a ground-based computer system, wherein the connection data identifies a physical localized identifier of the first beam;
receiving, from the ground-based computer system, a first group of localized identifiers that includes a first subset of the first virtual localized identifiers; and
transmitting, to the first UE via the first beam, the first group of localized identifiers.

51. The method according to claim 50, wherein the steps further include:
accepting, during the second time slot, a connection request from a second UE via a first beam of the second set of beams;
transmitting second connection data to the ground-based computer system, wherein the second connection data identifies a physical localized identifier of the first beam of the second set of beams;
receiving, from the ground-based computer system, a second group of localized identifiers that includes a first subset of the second virtual localized identifiers; and
transmitting, to the second UE via the first beam of the second set of beams, the second group of localized identifiers.

52. The method according to claim 50, wherein the step of transmitting the first group of localized identifiers comprises transmitting a first Tracking Area List.

* * * * *